United States Patent
Han et al.

(10) Patent No.: US 8,837,393 B2
(45) Date of Patent: Sep. 16, 2014

(54) METHOD AND APPARATUS FOR TRANSMITTING DATA IN RADIO COMMUNICATION SYSTEM

(75) Inventors: Seung Hee Han, Anyang-si (KR); Jae Hoon Chung, Anyang-si (KR); Yeong Hyeon Kwon, Anyang-si (KR); Hyun Soo Ko, Anyang-si (KR); Min Seok Noh, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 13/130,569

(22) PCT Filed: Nov. 18, 2009

(86) PCT No.: PCT/KR2009/006775
§ 371 (c)(1),
(2), (4) Date: May 20, 2011

(87) PCT Pub. No.: WO2010/058944
PCT Pub. Date: May 27, 2010

(65) Prior Publication Data
US 2011/0228748 A1 Sep. 22, 2011

Related U.S. Application Data

(60) Provisional application No. 61/117,222, filed on Nov. 23, 2008.

(30) Foreign Application Priority Data

Apr. 22, 2009 (KR) .................. 10-2009-0034853

(51) Int. Cl.
*H04W 4/00* (2009.01)
*H04B 7/216* (2006.01)
*H04B 7/212* (2006.01)
*H04B 7/02* (2006.01)
*H04B 7/06* (2006.01)

(52) U.S. Cl.
CPC ............ *H04B 7/0689* (2013.01); *H04B 7/0669* (2013.01); *H04B 7/0671* (2013.01)
USPC ............ 370/329; 370/335; 370/337; 375/267

(58) Field of Classification Search
USPC ......... 370/328, 329, 330, 334, 335, 336, 337, 370/344; 375/267, 299; 455/562.1
See application file for complete search history.

(56) References Cited

U.S. PATENT DOCUMENTS

2003/0026348 A1* 2/2003 Llang et al. .................. 375/267
2007/0147543 A1 6/2007 Ngo et al.
(Continued)

FOREIGN PATENT DOCUMENTS

KR  10-2002-0092747 A  12/2002
KR  10-2003-0030640 A  4/2003
(Continued)

*Primary Examiner* — Hassan Phillips
*Assistant Examiner* — Saba Tsegaye
(74) *Attorney, Agent, or Firm* — Lee, Hong, Degerman, Kang & Waimey

(57) ABSTRACT

The present invention provides a method and an apparatus for transmitting data in a radio communication system. The method for transmitting data in a radio communication system in which a radio resource for data transmission includes a plurality of data symbols in a time domain, wherein the method comprises the steps of transmitting first data using a space-time block coding (STBC) scheme via a portion of the data symbols from among the plurality of data symbols; and transmitting second data using a cyclic delay diversity (CDD) scheme via the residual data symbols excluding the portion of data symbols.

6 Claims, 24 Drawing Sheets

(56) References Cited

U.S. PATENT DOCUMENTS

| | | | |
|---|---|---|---|
| 2008/0101493 A1* | 5/2008 | Niu et al. | 375/267 |
| 2008/0285677 A1* | 11/2008 | Lee et al. | 375/295 |
| 2009/0135791 A1* | 5/2009 | Kawamura et al. | 370/337 |
| 2009/0161605 A1* | 6/2009 | Shen et al. | 370/328 |
| 2010/0041350 A1* | 2/2010 | Zhang et al. | 455/101 |
| 2010/0046445 A1* | 2/2010 | Sawahashi et al. | 370/329 |
| 2010/0067512 A1* | 3/2010 | Nam et al. | 370/342 |
| 2010/0085955 A1* | 4/2010 | Luo et al. | 370/344 |
| 2010/0311431 A1* | 12/2010 | Papasakellariou et al. | 455/450 |
| 2011/0143696 A1* | 6/2011 | Luo et al. | 455/101 |
| 2012/0307928 A1* | 12/2012 | Jia et al. | 375/267 |

FOREIGN PATENT DOCUMENTS

| KR | 10-2005-0069802 A | 7/2005 |
|---|---|---|
| KR | 10-2008-0087153 A | 9/2008 |

* cited by examiner

METHOD AND APPARATUS FOR TRANSMITTING DATA IN RADIO COMMUNICATION SYSTEM

CROSS-REFERENCE TO RELATED APPLICATIONS

This application is the National Stage filing under 35 U.S.C. 371 of International Application No. PCT/KR2009/006775, filed on Nov. 18, 2009, which claims the benefit of earlier filing date and right of priority to Korean Application No. 10-2009-0034853, filed on Apr. 22, 2009, and also claims the benefit of U.S. Provisional Application Ser. No. 61/117,222, filed on Nov. 23, 2008, the contents of which are all incorporated by reference herein in their entirety.

BACKGROUND OF THE INVENTION

1. Field of the Invention

The present invention relates to wireless communications, and more particularly, to a method and apparatus for transmitting data and control information in a wireless communication system.

2. Related Art

In next generation multimedia wireless communication systems, which have been actively studied in recent years, there is a demand for a system capable of processing and transmitting a variety of information (e.g., video and radio data) at a higher data rate in addition to the early-stage voice service. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment (UE), etc. Various techniques have been developed to overcome the abnormal characteristic of the wireless channel and to increase reliability of radio communication.

A multiple input multiple output (MIMO) scheme is used as a technique for supporting a reliable high-speed data service. The MIMO scheme uses multiple transmit antennas and multiple receive antennas to improve data transmission/reception efficiency. Examples of the MIMO scheme include spatial multiplexing, transmit diversity, beamforming, etc. A MIMO channel matrix depending on the number of receive antennas and the number of transmit antennas can be decomposed into a plurality of independent channels. Each independent channel is referred to as a spatial layer or a stream. The number of streams is referred to as a rank.

In general, the wireless communication system is a multiple access system capable of supporting communication with multi-users by sharing available radio resources. Examples of the radio resource include a time, a frequency, a code, transmit power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc.

SC-FDMA may have a lower peak-to-average power ratio (PAPR) or cubic metric (CM) while having almost the same complexity with OFDMA. When the PAPR is low, a transmitter can effectively transmit data by avoiding a non-linear distortion duration of a power amplifier. Since the low PAPR is advantageous to the UE in terms of transmit power efficiency, the SC-FDMA is adopted in uplink transmission in $3^{rd}$ generation partnership project (3GPP) long term evolution (LTE) as disclosed in the section 5 of 3GPP TS 36.211 V8.2.0 (2008-03) "Technical Specification Group Radio Access Network; Evolved Universal Terrestrial Radio Access (E-UTRA); Physical channels and modulation (Release 8)". The 3GPP LTE standard defines only single-stream transmission by using only a single transmit antenna.

Meanwhile, there is an ongoing standardization effort for an international mobile telecommunication-advanced (IMT-A) system aiming at the support of an Internal protocol (IP)-based multimedia seamless service by using a high-speed data transfer rate of 1 gigabits per second (Gbps) in a downlink and 500 megabits per second (Mbps) in an uplink in the international telecommunication union (ITU) as a next generation (i.e., post $3^{rd}$ generation) mobile communication system. A $3^{rd}$ generation partnership project (3GPP) is considering a 3GPP long term evolution-advanced (LTE-A) system as a candidate technique for the IMT-A system. It is expected that the LTE-A system is developed to further complete an LTE system while maintaining backward compatibility with the LTE system. This is because the support of compatibility between the LTE-A system and the LTE system facilitates user convenience. In addition, the compatibility between the two systems is also advantageous from the perspective of service providers since the existing equipment can be reused.

Improvement of an uplink maximum transfer rate is significantly emphasized among requirements of the LTE-A system. This is because it is difficult to satisfy the maximum transfer rate required by the IMT-A system when using only SC-FDMA employing the single transmit antenna. A system considered for transfer rate improvement is a system in which the MIMO and the legacy SC-FDMA are combined.

Accordingly, there is a need for a method and apparatus for effective data transmission in a multi-antenna system.

SUMMARY OF THE INVENTION

The present invention provides a method and apparatus for data transmission in a wireless communication system.

In an aspect, a method for data transmission performed by a user equipment in a wireless communication system is provided. A radio resource for data transmission includes M data symbols (M≥3, where M is a natural number) in a time domain, and the method includes transmitting first data by using a space-time block coding (STBC) scheme through N data symbols out of the M data symbols (N<M, where N is a natural number), and transmitting second data by using a cyclic delay diversity (CDD) scheme through M−N data symbols excluding the N data symbols.

In another aspect, a transmitter includes a radio frequency (RF) unit generating and transmitting a radio signal, and a data processor coupled to the RF unit and configured for processing first data transmitted through a plurality of data symbols by using a space-time block coding (STBC) scheme, and processing second data transmitted through the remaining data symbols excluding the plurality of data symbols by using a cyclic delay diversity (CDD) scheme is provided.

According to the present invention, a method and apparatus for effective data transmission in a multi-antenna system are provided. Therefore, overall system performance can be improved.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. The UTRA is part of a universal mobile telecommunications system (UMTS). 3GPP ($3^{rd}$ Generation, Partnership Project) LTE (Long Term Evolution) is part of an evolved UMTS (E-UMTS) using the E-UTRA, which employs the OFDMA in downlink and the SC-FDMA in uplink. LTE-A (Advanced) is an evolution of 3GPP LTE.

Hereinafter, for clarification, 3GPP LTE/LTE-A will be largely described, but the technical concept of the present invention is not meant to be limited thereto.

Figure 1:
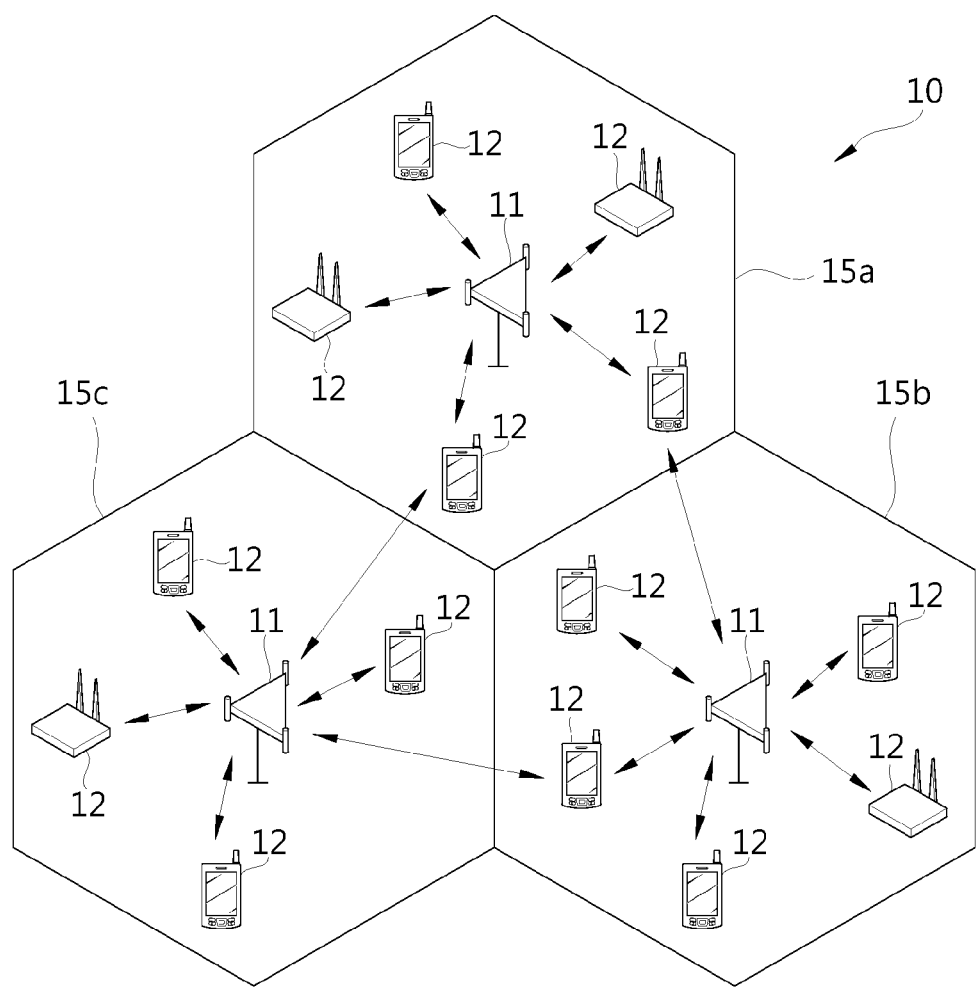
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

A multiple antenna system may be any one of a multiple input multiple output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, the Tx antenna denotes a physical or logical antenna used for transmission of one signal or stream. The Rx antenna denotes a physical or logical antenna used for reception of one signal or stream.

Figure 2:
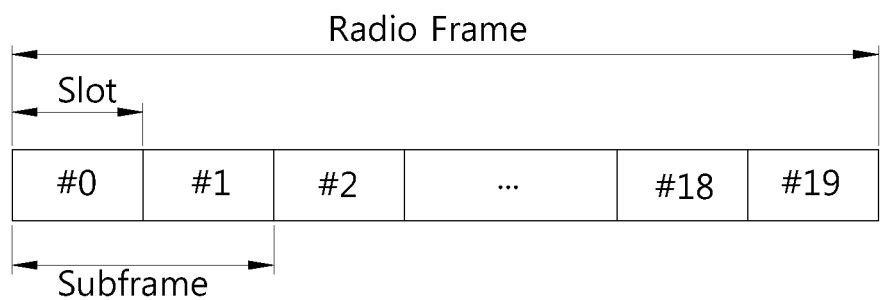
FIG. 2 shows a structure of a radio frame in 3GPP LTE.

FIG. 2 shows a structure of a radio frame in 3GPP LTE.

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 2 is shown for exemplary purposes only. Thus, the number of subframes included in the radio frame or the number of slots included in the subframe may change variously.

Figure 3:
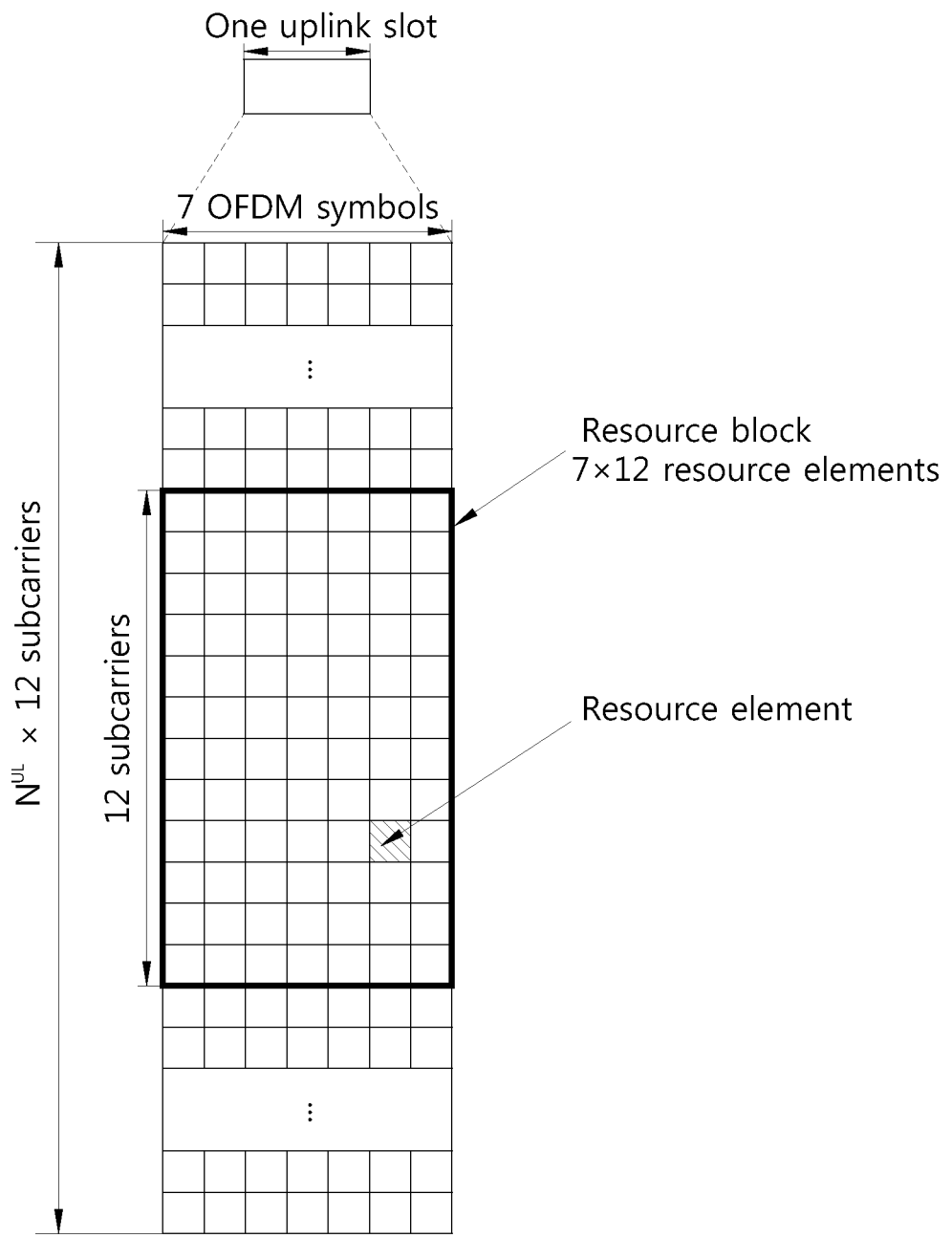
FIG. 3 shows an example of a resource grid for one UL slot in 3GPP LTE.

FIG. 3 shows an example of a resource grid for one UL slot in 3GPP LTE.

Referring to FIG. 3, the UL slot includes a plurality of orthogonal frequency division multiplexing (OFDM) symbols in a time domain, and includes $N^{UL}$ resource blocks (RBs) in a frequency domain. The OFDM symbol represents one symbol period. The OFDM symbol can also be referred to as an SC-FDMA symbol, an OFDMA symbol, or a symbol period according to a system. The RB includes a plurality of subcarriers in the frequency domain. The number $N^{UL}$ of RBs included in the UL slot depends on a UL transmission bandwidth defined in a cell. Each element on the resource grid is referred to as a resource element.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of subcarriers or the number of OFDM symbols included in the RB may change variously. The number of OFDM symbols may change depending on a cyclic prefix (CP) length. For example, when using a normal CP, the number of OFDM symbols is 7, and when using an extended CP, the number of OFDM symbols is 6.

The resource grid for one UL slot in the 3GPP LTE of FIG. 3 can directly apply to a resource grid for a DL slot.

Figure 4:
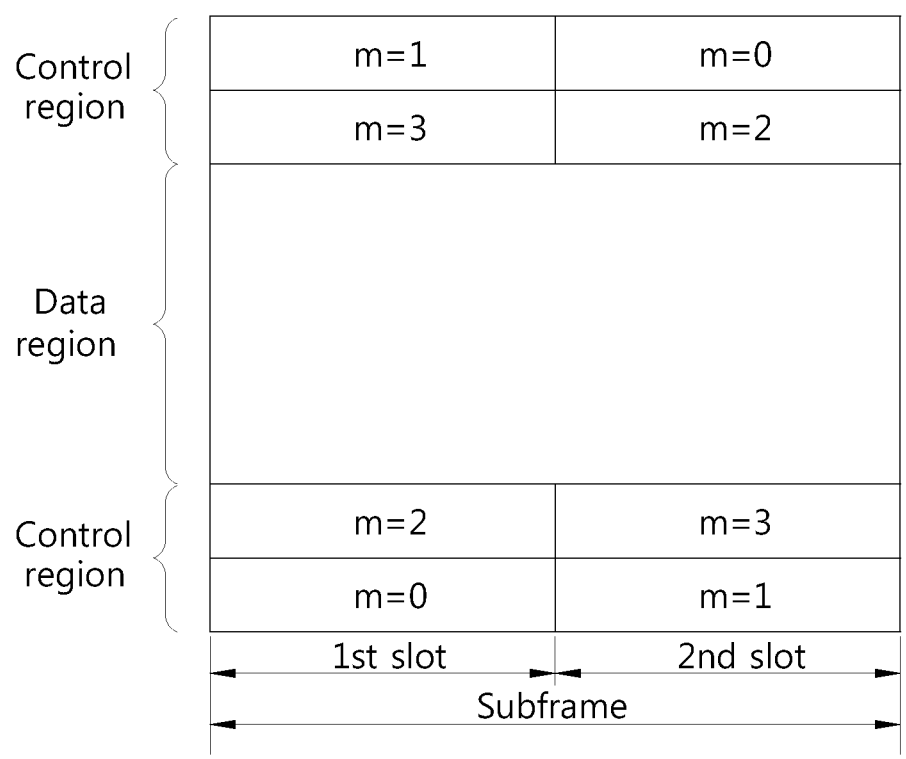
FIG. 4 shows an example of a UL subframe structure in 3GPP LTE.

FIG. 4 shows an example of a UL subframe structure in 3GPP LTE.

Referring to FIG. 4, a UL subframe can be divided into a control region to which a physical uplink control channel (PUCCH) for carrying UL control information is allocated and a data region to which a physical uplink shared channel (PUSCH) for carrying UL data is allocated. RBs allocated to one UE are contiguous in a frequency domain in order to maintain a single-carrier property. One UE cannot concurrently transmit the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. Since the UE transmits UL control information over time through different subcarriers, a frequency diversity gain can be obtained. In FIG. 4, m is a location index indicating a logical frequency-domain location of the RB pair allocated to the PUCCH in the subframe.

Examples of UL control information transmitted on the PUCCH include a hybrid automatic repeat request (HARQ) acknowledgement (ACK)/negative acknowledgement (NACK) signal, a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the UL data may be multiplexed data. The multiplexed data may be attained by multiplexing control information and the transport block for the UL-SCH. Examples of the control information multiplexed to the data include a CQI, a precoding matrix indicator (PMI), an HARQ ACK/NACK signal, a rank indicator (RI), etc. On the other hand, the UL data may consist of only control information.

Hereinafter, a data transmission method will be described. Although the following description is based on UL data transmitted from a UE to a BS, it is also applicable to DL data transmitted from the BS to the UE.

Figure 5:
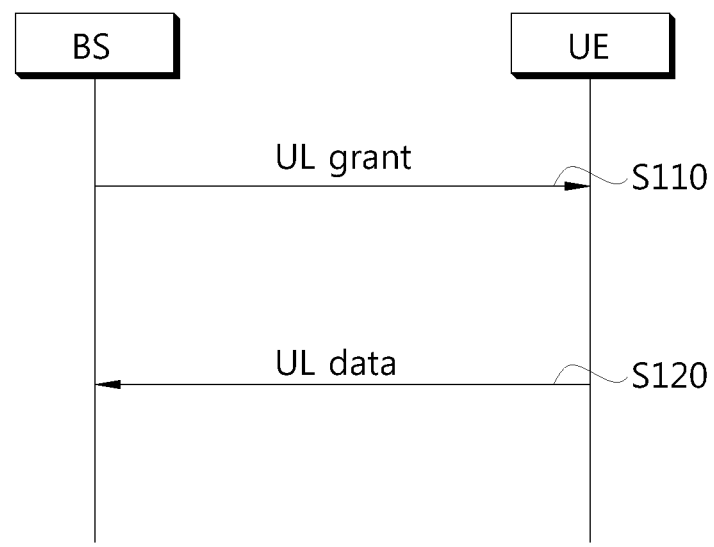
FIG. 5 is a flowchart showing an example of a data transmission method.

FIG. 5 is a flowchart showing an example of a data transmission method.

Referring to FIG. 5, a BS transmits a UL grant to a UE (step S110). The UE transmits UL data to the BS by using the UL grant (step S120). The UL grant may be transmitted on a physical downlink control channel (PDCCH), and the UL data may be transmitted on a PUSCH. A relationship between a subframe in which the PDCCH is transmitted and a subframe in which the PUSCH is transmitted may be predetermined between the BS and the UE. For example, in a frequency division duplex (FDD) system, if the PDCCH is transmitted through an $n^{th}$ subframe, the PUSCH may be transmitted through an $(n+4)^{th}$ subframe.

The UL grant is DL control information for UL data scheduling. The UL grant includes a resource allocation field. The UL grant may further include a hopping flag for indicating whether frequency hopping is performed, a flag for identifying the UL grant from other DL control information, a transmission format field for indicating a transmission format for UL data, a new data indicator (NDI) for indicating whether the UL grant is for transmission of new UL data or retransmission of the UL data, a transmit power control (TPC) command field for UL power control, a CS field for indicating a cyclic shift (CS) of a demodulation reference signal (DM RS), a CQI request indicator for indicating whether to request a CQI, etc.

The resource allocation field indicates a radio resource for UL data transmission. The radio resource may be a time-frequency resource. In 3GPP LTE, the radio resource allocated by the resource allocation field is a resource block. By using the resource allocation field, a UE can know a location of a resource block in a subframe allocated for UL data transmission, the number of resource blocks, etc.

If the hopping flag does not indicate the frequency hopping, resource blocks allocated to the UE in $1^{st}$ and $2^{nd}$ slots in a subframe are identical in a frequency domain. If the hopping flag indicates the frequency hopping, the resource blocks allocated to the UE in the $1^{st}$ and $2^{nd}$ slots may be different in the frequency domain.

Examples of radio resource scheduling include dynamic scheduling, persistent scheduling, semi-persistent scheduling (SPS), etc. If the radio resource scheduling is the persistent scheduling or the semi-persistent scheduling, the UE is able to transmit UL data without having to receive a UL grant.

It is assumed hereinafter that a radio resource for data transmission includes a plurality of OFDM symbols in a time domain, and includes a plurality of subcarriers in a frequency domain.

Figure 6:
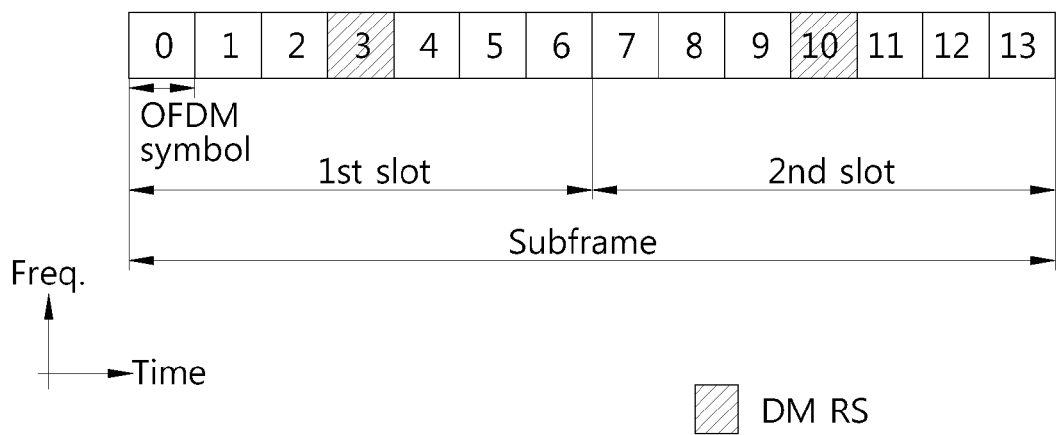
FIG. 6 shows an example of a radio resource for data transmission in case of a normal CP.

FIG. 6 shows an example of a radio resource for data transmission in case of a normal CP.

Referring to FIG. 6, a subframe includes a $1^{st}$ slot and a $2^{nd}$ slot. Each of the $1^{st}$ slot and the $2^{nd}$ slot includes 7 OFDM symbols. 14 OFDM symbols in the subframe are numbered with symbol indices 0 to 13. A DM RS is transmitted by using OFDM symbols having symbol indices 3 and 10. Data is transmitted by using the remaining OFDM symbols other than the OFDM symbols in which the DM RS is transmitted. The DM RS is used for channel estimation for data demodulation and is a signal known to both a transmitter and a receiver.

Figure 7:
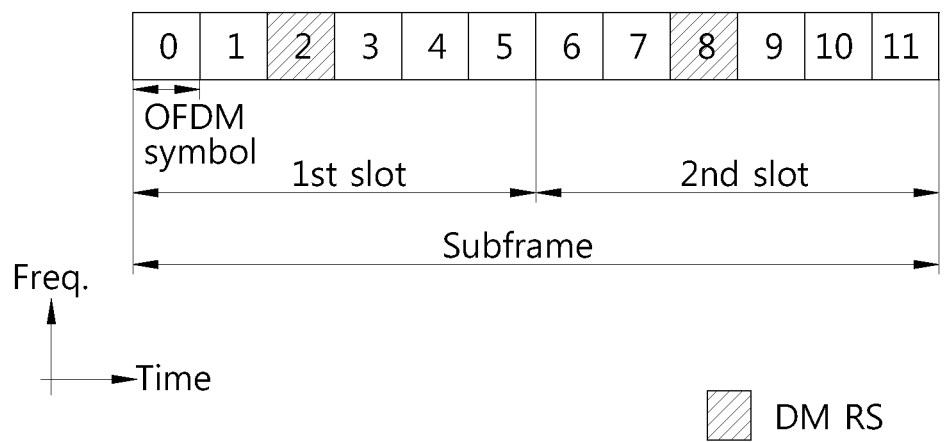
FIG. 7 shows an example of a radio resource for data transmission in case of an extended CP.

FIG. 7 shows an example of a radio resource for data transmission in case of an extended CP.

Referring to FIG. 6, a subframe includes a $1^{st}$ slot and a $2^{nd}$ slot. Each of the $1^{st}$ slot and the $2^{nd}$ slot includes 6 OFDM symbols. 12 OFDM symbols in the subframe are numbered with symbol indices 0 to 11. A DM RS is transmitted by using OFDM symbols having symbol indices 2 and 8. Data is transmitted by using the remaining OFDM symbols other than the OFDM symbols in which the DM RS is transmitted.

Although not shown in FIG. 6 and FIG. 7, a sounding reference signal (SRS) may also be transmitted through an OFDM symbol in the subframe. The SRS is a reference signal transmitted for UL scheduling from a UE to a BS. The BS estimates a UL channel through the received SRS, and uses the estimated UL channel in UL scheduling. The reference signal implies the DM RS and/or the SRS.

Hereinafter, an OFDM symbol for data transmission is referred to as a data symbol, an OFDM symbol for DM RS transmission is referred to as a DM RS symbol, and an OFDM symbol for SRS transmission is referred to as an SRS symbol. A reference signal symbol implies the DM RS symbol and/or the SRS symbol. In FIG. 6, there are 12 data symbols and 2 DM RS symbols in one subframe. In FIG. 7, there are 10 data symbols and 2 DM RS symbols in one subframe.

Figure 8:
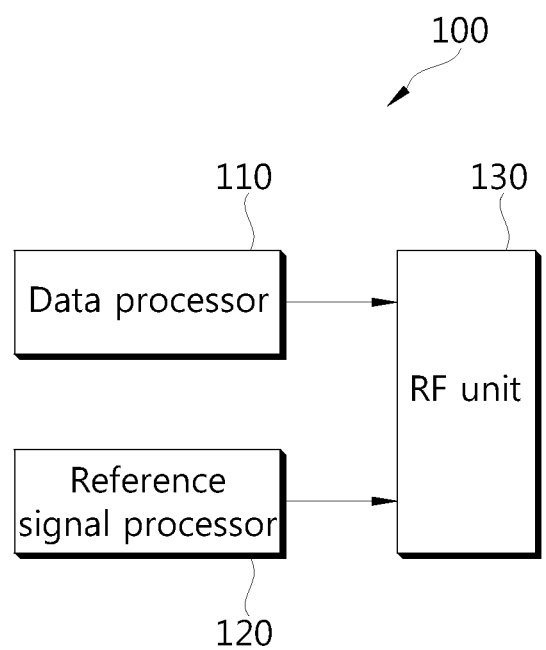
FIG. 8 is a block diagram showing an exemplary structure of a transmitter. Herein, the transmitter may be a part of a UE or a BS.

FIG. 8 is a block diagram showing an exemplary structure of a transmitter. Herein, the transmitter may be a part of a UE or a BS.

Referring to FIG. 8, a transmitter 100 includes a data processor 110, a reference signal processor 120, and a radio frequency (RF) unit 130. The RF unit 130 is coupled to the data processor 110 and the reference signal processor 120. The data processor 110 processes data to generate a baseband signal for the data. The reference signal processor 120 generates and processes a reference signal, and generates a baseband signal for the reference signal. The RF unit 130 converts the baseband signal (i.e., the baseband signal for the data and/or the baseband signal for the reference signal) into a radio signal, and transmits the radio signal. In this case, the baseband signal can be converted to the radio signal by being up-converted to a carrier frequency which is a center frequency of a cell.

Figure 9:
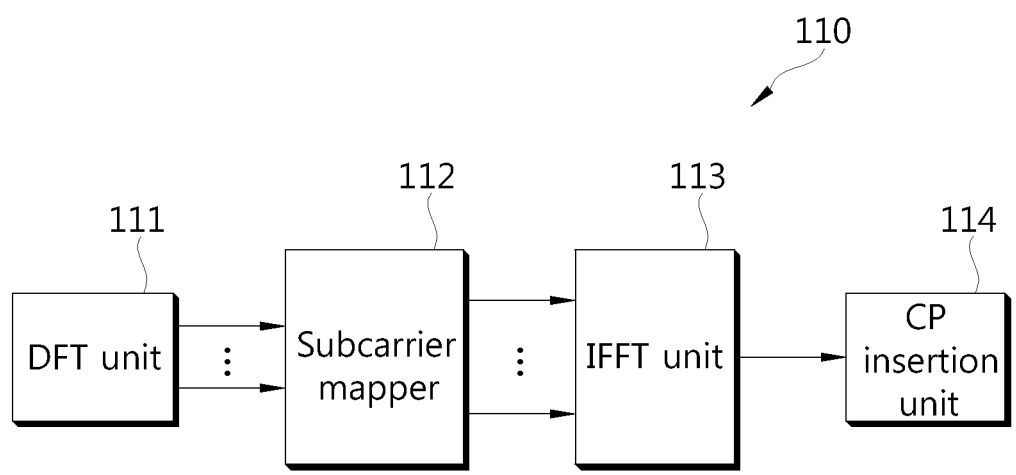
FIG. 9 is a block diagram showing an exemplary structure of a data processor. Herein, the data processor may be included in a transmitter.

FIG. 9 is a block diagram showing an exemplary structure of a data processor. Herein, the data processor may be included in a transmitter.

Referring to FIG. 9, a transmitter 100 includes a discrete Fourier transform (DFT) unit 111, a subcarrier mapper 112, an inverse fast Fourier transform (IFFT) unit 113, and a CP insertion unit 114. The transmitter 100 may further include a channel coding unit (not shown) and a modulator (not shown). The channel coding unit performs channel coding on information bits to generate a coded bit. The information bits may be data transmitted from the transmitter. The modulator maps the coded bit onto a symbol for representing a position on a signal constellation to generate modulated symbols. There is no restriction on a modulation scheme. The modulation scheme may be m-phase shift keying (m-PSK) or m-quadrature amplitude modulation (m-QAM). The modulated symbols are input to the DFT unit 111.

The DFT unit 111 performs DFT on the input symbols to output complex-valued symbols. For example, if $N_{Tx}$ symbols are input, a DFT size is $N_{Tx}$ (where $N_{Tx}$ is a natural number).

The subcarrier mapper 112 maps the complex-valued symbols to respective subcarriers in a frequency domain. The complex-valued symbols can be mapped to resource elements corresponding to a resource block allocated for data transmission. The IFFT unit 113 performs IFFT on the input symbols to output a baseband signal for data as a time-domain signal. If an IFFT size is $N_{FFT}$, $N_{FFT}$ can be determined by a channel bandwidth (where $N_{FFT}$ is a natural number). The CP insertion unit 114 copies a rear part of the baseband signal for the data and inserts the copy in front of the baseband signal for the data. Inter symbol interference (ISI) and inter carrier interference (ICI) are avoided by CP insertion, and thus orthogonality can be maintained even in a multi-path channel.

As such, a transmission mechanism in which IFFT is performed after DFT spreading is referred to as SC-FDMA. The SC-FDMA can also be referred to as DFT spread-OFDM (DFTs-OFDM). In the SC-FDMA, a peak-to-average power ratio (PAPR) or a cubic metric (CM) can be decreased. When using the SC-FDMA transmission mechanism, transmit power efficiency can be increased in a UE of which power consumption is limited. Accordingly, a user throughput can be increased.

Figure 10:
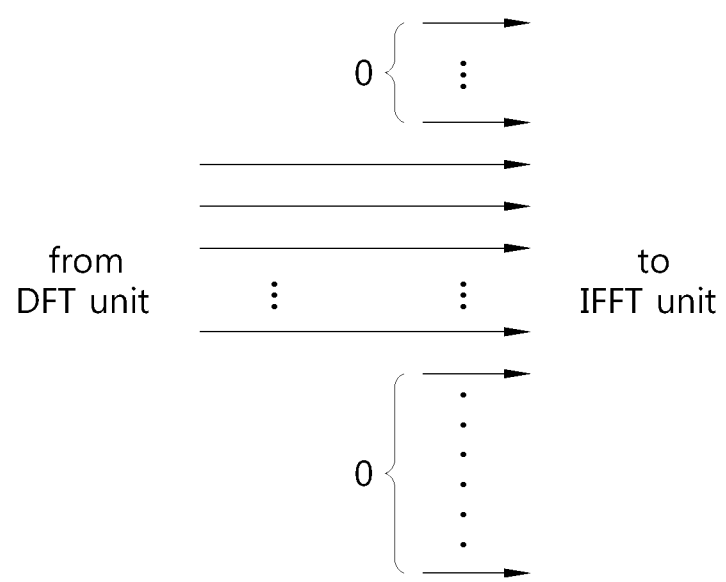
FIG. 10 shows an exemplary method of mapping complex-valued symbols onto respective subcarriers in a frequency domain by a subcarrier mapper.

FIG. 10 shows an exemplary method of mapping complex-valued symbols onto respective subcarriers in a frequency domain by a subcarrier mapper.

Referring to FIG. 10, the subcarrier mapper maps complex-valued symbols output from a DFT unit onto consecutive subcarriers in the frequency domain. '0' is inserted to subcarriers onto which the plurality of complex-valued symbols is not mapped. This is referred to as localized mapping. The localized mapping is used in 3GPP LTE.

Figure 11:
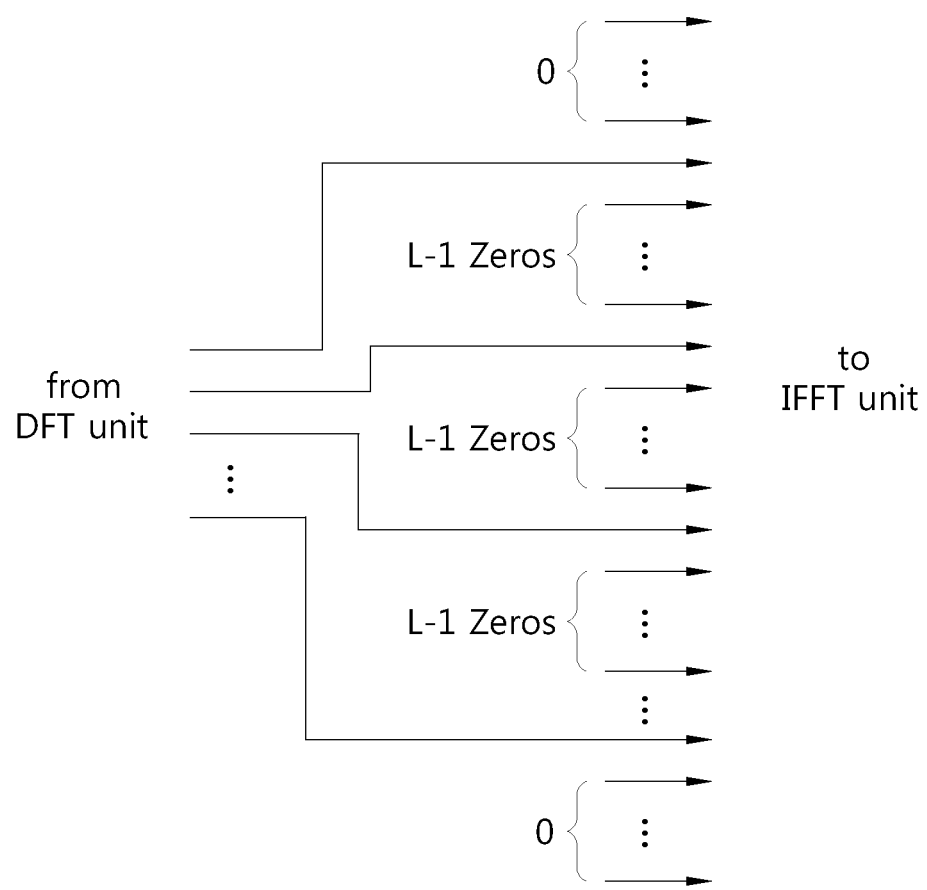
FIG. 11 shows another exemplary method of mapping complex-valued symbols onto respective subcarriers in a frequency domain by a subcarrier mapper.

FIG. 11 shows another exemplary method of mapping complex-valued symbols onto respective subcarriers in a frequency domain by a subcarrier mapper.

Referring to FIG. 11, the subcarrier mapper inserts L−1 zeros (where L is a natural number) into every two consecutive complex-valued symbols output from a DFT unit. That is, the complex-valued symbols output from the DFT unit are mapped onto subcarriers equidistantly distributed in the frequency domain. This is referred to as distributed mapping.

When the subcarrier mapper uses the localized mapping of FIG. 10 or the distributed mapping of FIG. 11, a single-carrier property is maintained.

Figure 12:
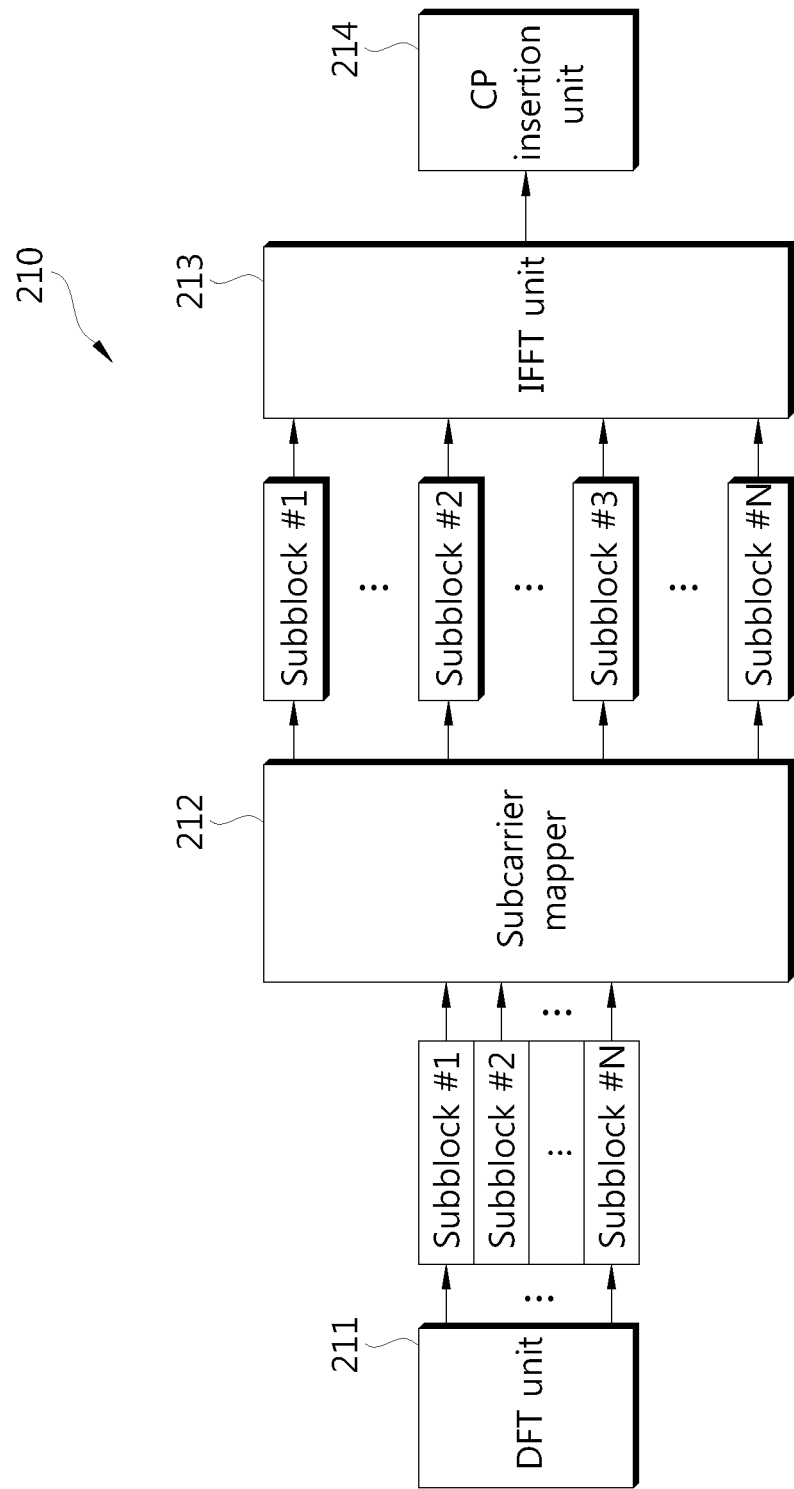
FIG. 12 is a block diagram showing another exemplary structure of a data processor. Herein, the data processor may be included in a transmitter.

FIG. 12 is a block diagram showing another exemplary structure of a data processor. Herein, the data processor may be included in a transmitter.

Referring to FIG. 12, a data processor 210 includes a DFT unit 211, a subcarrier mapper 212, an IFFT unit 213, and a CP insertion unit 214.

Complex-valued symbols output from the DFT unit 211 are segmented into N sub-blocks (where N is a natural number). Herein, the N sub-blocks can be represented with a sub-block #1, a sub-block #2, . . . , a sub-block #N. The subcarrier mapper 212 maps the N sub-blocks onto subcarriers by distributing the sub-blocks in a frequency domain. NULL can be inserted into every two consecutive sub-blocks. Complex-valued symbols in one sub-block can be mapped to consecutive subcarriers in the frequency domain. That is, localized mapping can be used in one sub-block.

The data processor of FIG. 12 can be used in both a single-carrier transmitter and a multi-carrier transmitter. The single-carrier transmitter is a transmitter using one carrier, and the multi-carrier transmitter is a transmitter using multiple carriers. When used in the single-carrier transmitter, all of the N sub-blocks correspond to one carrier. On the other hand, when used in multi-carrier transmitter, each of the N sub-blocks may correspond to one carrier. Alternatively, when used in the multi-carrier transmitter, a plurality of sub-blocks among the N sub-blocks may correspond to one carrier.

However, a time-domain signal is generated in the data processor of FIG. 12 by using one IFFT unit. Therefore, in order for the data processor to be used in the multi-carrier transmitter, a subcarrier spacing between contiguous carriers has to be aligned in a contiguous carrier allocation situation.

Figure 13:
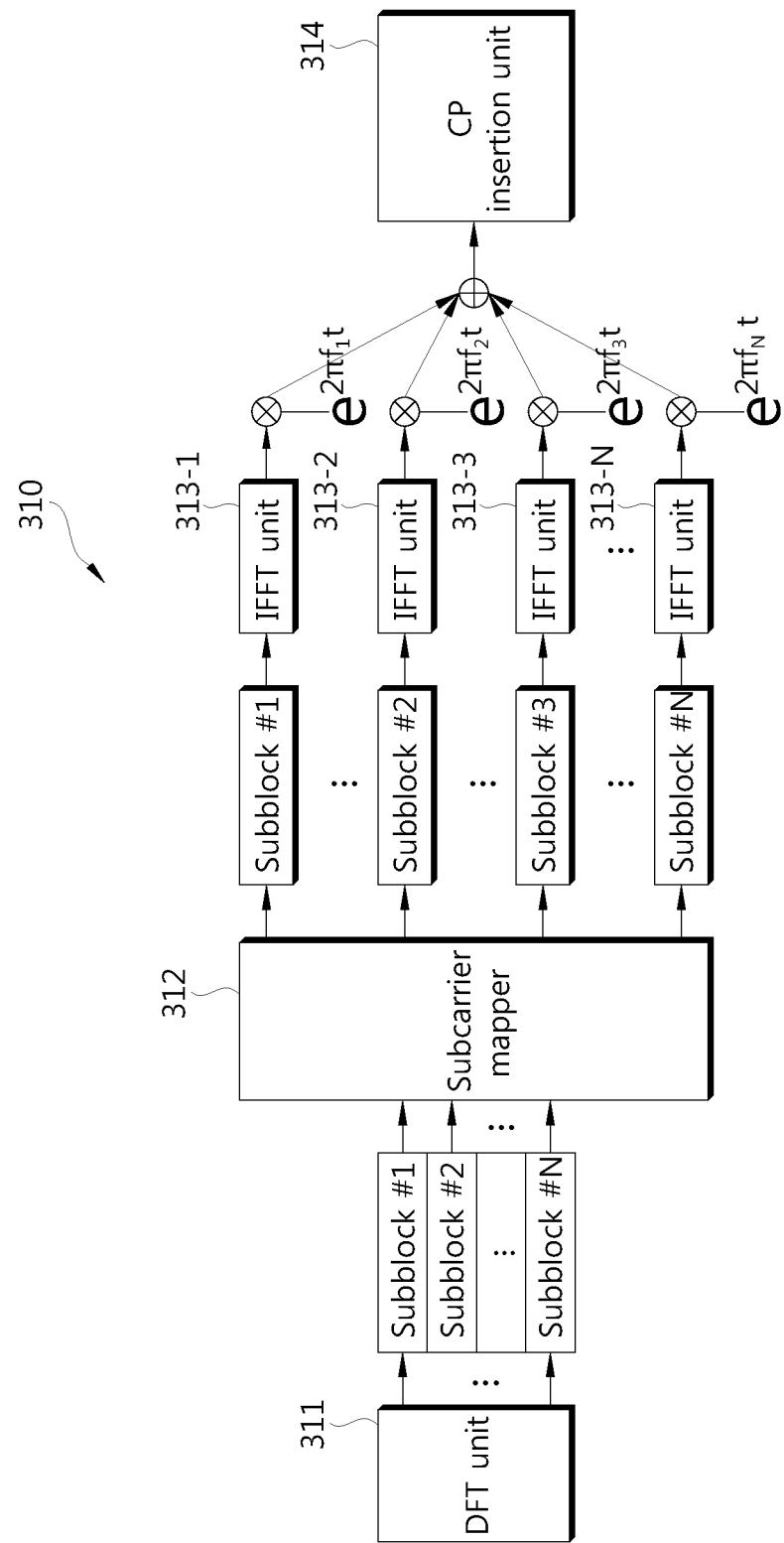
FIG. 13 is a block diagram showing another exemplary structure of a data processor.

FIG. 13 is a block diagram showing another exemplary structure of a data processor. Herein, the data processor may be included in a multi-carrier transmitter.

Referring to FIG. 13, a data processor 310 includes a DFT unit 311, a subcarrier mapper 312, a plurality of IFFT units 313-1, 313-2, . . . , 313-N, and a CP insertion unit 214 (where N is a natural number). IFFT is individually performed on each of N sub-blocks. An $n^{th}$ IFFT unit 313-$n$ performs IFFT on a sub-block #n to output an $n^{th}$ baseband signal (where n=1, 2, . . . , N). The $n^{th}$ baseband signal is multiplied by a signal of an $n^{th}$ carrier signal $f_n$ to generate an $n^{th}$ radio signal.

N radio signals generated from the N sub-blocks are added, and thereafter a CP is inserted by the CP insertion unit 214.

The data processor of FIG. 13 can be used in a non-contiguous carrier allocation situation in which carriers allocated to the transmitter are not contiguous to each other.

As shown in FIG. 12 and FIG. 13, when symbols output from the DFT unit are processed by being divided into a plurality of sub-blocks, it is called clustered SC-FDMA.

Figure 14:
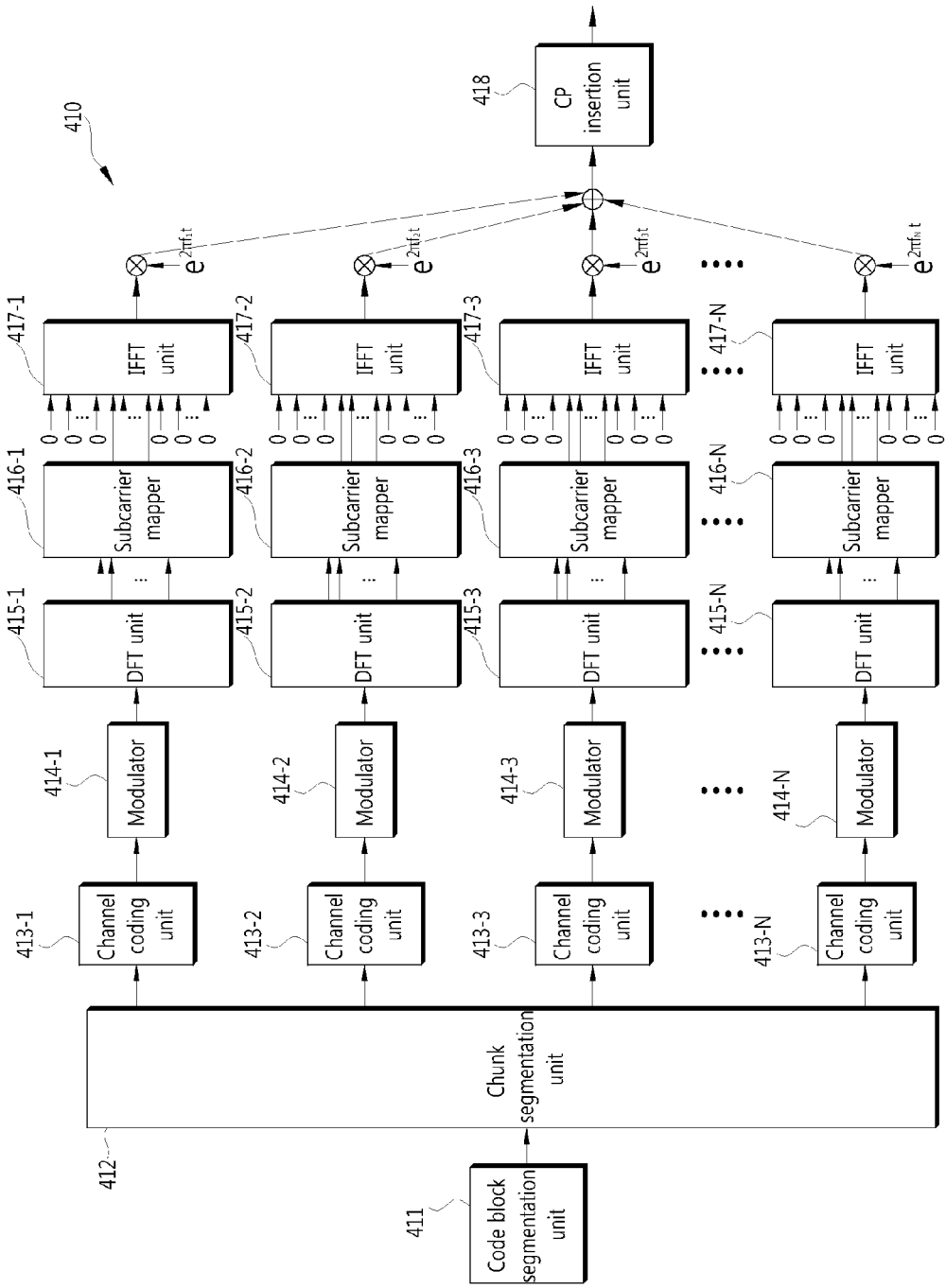
FIG. 14 is a block diagram showing another exemplary structure of a data processor.

FIG. 14 is a block diagram showing another exemplary structure of a data processor. Herein, the data processor may be included in a multi-carrier transmitter.

Referring to FIG. 14, a data processor 410 includes a code block segmentation unit 411, a chunk segmentation unit 412, a plurality of channel coding units 413-1, . . . , 413-N, a plurality of modulators 414-1, . . . , 414-N, a plurality of DFT units 415-1, . . . , 415-N, a plurality of subcarrier mappers 416-1, . . . , 416-N, a plurality of IFFT units 417-1, . . . , 417-N, and a CP insertion unit 418 (where N is a natural number). Herein, N can be the number of multiple carriers used in the multi-carrier transmitter.

The code block segmentation unit 411 segments a transport block into a plurality of code blocks. The chunk segmentation unit 412 segments the code block into a plurality of chunks. Herein, the code block can be data transmitted from a multi-carrier transmitter, and the chunk can be a data fragment transmitted by using one carrier among multiple carriers. The data processor 410 performs DFT in a unit of chunks. The data processor 410 can be used in both a non-contiguous carrier allocation situation and a contiguous carrier allocation situation. A transmission mechanism in which DFT is performed in a unit of chunks as shown in FIG. 14 is referred to as chunk specific DFTs-OFDM or N×SC-FDMA.

Hereinafter, an OFDM symbol implies a symbol to which OFDMA, SC-FDMA, clustered DFTS-OFDM, or chunk specific DFTS-OFDM is applied.

Figure 15:
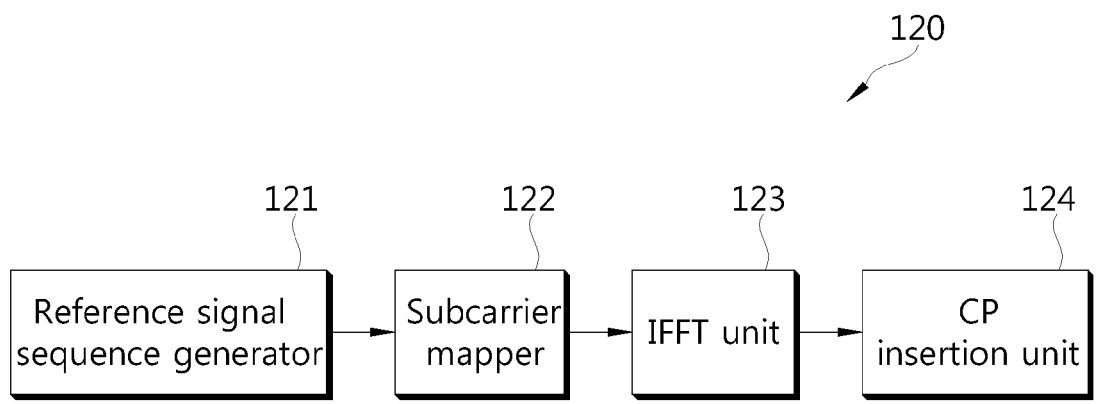
FIG. 15 is a block diagram showing an exemplary structure of a reference signal processor.

FIG. 15 is a block diagram showing an exemplary structure of a reference signal processor. Herein, the reference signal processor may be included in a transmitter.

Referring to FIG. 15, a reference signal processor 120 includes a reference signal sequence generator 121, a subcarrier mapper 122, an IFFT unit 123, and a CP insertion unit 124.

The reference signal sequence generator 121 generates a reference signal sequence consisting of complex-valued elements. The subcarrier mapper 122 maps the complex-valued elements constituting the reference signal sequence onto respective subcarriers. If it is a reference signal sequence for a DM RS, the complex-valued elements are mapped to subcarriers of DM RS symbols in a subframe (see FIG. 6 and FIG. 7). The reference signal sequence for the DM RS can be mapped to subcarriers by using localized mapping. In case of a reference signal sequence for an SRS, the complex-valued elements are mapped to subcarriers of the SRS in a subframe.

The IFFT unit 123 performs IFFT on input symbols to output a baseband signal for a reference signal as a time-domain signal. The CP insertion unit 124 copies a rear part of the baseband signal for the reference signal and inserts the copy in front of the baseband signal for the reference signal.

The subcarrier mapper, the IFFT unit, and the CP insertion unit included in the reference signal processor may be the same as the subcarrier mapper, the IFFT unit, and the CP insertion unit included in the data processor. The reference signal processor and the data processor may share the subcarrier mapper, the IFFT unit, and the CP insertion unit by using a switching operation based on time.

Hereinafter, a reference signal sequence will be described in detail.

The reference signal sequence uses a cyclically shifted sequence. The cyclically shifted sequence can be generated by cyclically shifting a base sequence by a cyclic shift (CS) amount. Various types of sequence can be used as the base sequence. For example, the base sequence may be a well-known sequence as such a pseudo-random (PN) sequence and a Zadoff-Chu (ZC) sequence. Alternatively, base sequence may be a computer generated constant amplitude zero auto-correlation (CAZAC) sequence. Alternatively, the base sequence may be generated by using another method according to a length of the base sequence.

The base sequence can be denoted by ru,v(n). Herein, i∈{0, 1, . . . , 29} denotes a sequence group number, v denotes a base sequence number in a group, and n denotes a component index in the range of $0 \le n \le M-1$, where M is a base sequence length. The length M of the base sequence may be the same as the number of subcarriers included in one demodulation RS symbol in a subframe. For example, if one resource block includes 12 subcarriers and if 3 resource blocks are allocated for data transmission, the length M of the base sequence is 36.

Equation 1 shows an example of the base sequence ru,v(n).

$$r_{u,v}(n) = x_q(n \bmod N)$$ [Equation 1]

Herein, xq denotes a ZC sequence having a root index q, and N denotes a length of the sequence xq. 'mod' denotes a modular operation. That is, the base sequence has a format in which the sequence xq is cyclically extended. When one resource block includes 12 subcarriers, the length M of the base sequence may be greater than or equal to 36.

The ZC sequence xq(m) having the root index q can be defined by Equation 2 below.

$$x_q(m) = \exp\left\{-\frac{j\pi qm(m+1)}{N}\right\},$$ [Equation 2]

when $N$ is odd number $$x_q(m) = \exp\left\{-\frac{j\pi qm^2}{N}\right\}, \text{ where } N \text{ is even number}$$

Herein, N denotes a length of xq(m), where m satisfies $0 \le m \le N-1$. N may be a greatest prime number among natural numbers less than the length M of the base sequence. q is a natural number less than or equal to N, and q and N are relatively prime. If N is a prime number, the number of root indices q is N-1.

The root index q can be expressed by Equation 3 below.

$$q = \lfloor \bar{q} + \tfrac{1}{2} \rfloor + v \cdot (-1)^{\lfloor 2\bar{q} \rfloor}$$

$$\bar{q} = N \cdot (u-1)/31$$ [Equation 3]

When one resource block includes 12 subcarriers, a computer generated CAZAC sequence may be used as the base sequence if the length M of the base sequence is 12 or 24. If the length M of the base sequence is 12 or 24, a base sequence number v in a group is 0 since each group includes only one base sequence.

If the length M of the base sequence is 12 or 24, an example of the base sequence ru,v(n) can be expressed by Equation 4 below.

$$r_{u,v}(n) = e^{jb(n)\pi/4}$$ [Equation 4]

The base sequence is defined differently according to a group number u.

If M=12, b(n) can be defined by Table 1 below.

TABLE 1

| u | b(0), . . . , b(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | 3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

If M=24, b(n) can be defined by Table 2 below.

TABLE 2

| u | b(0), . . . , b(23) | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −1 | −3 | −3 | −3 | 3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | −1 | 1 | 1 | −3 | 1 | 3 | −1 | −3 | 3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

The base sequence $r_{u,v}(n)$ can vary depending on the sequence group unit u and the base sequence number v. The sequence group number u and the base sequence number v in the group may change semi-statically or may change in every slot. When the sequence group number u changes in every slot, it is called group hopping. When the base sequence number v in the group changes in every slot, it is called sequence hopping. Whether it is the group hopping or the sequence hopping can be determined by a higher layer of a physical layer. For example, the higher layer may be a radio resource control (RRC) that serves to control radio resources between a UE and a network.

The sequence group number u can be determined by Equation 5 below.

$$u=(f_{gh}(n_s)+f_{ss}) \bmod 30 \quad \text{[Equation 5]}$$

Herein, fgh(ns) denotes a group hopping pattern, ns denotes a slot number in a radio frame, and fss denotes a sequence shift pattern. In this case, 17 different hopping patterns and 30 different sequence shift patterns exist.

If the group hopping is not set, the group hopping pattern fgh(ns) is 0. If the group hopping is set, the group hopping pattern fgh(ns) can be expressed by Equation 6 below.

$$f_{gh} = \left( \sum_{i=0}^{7} c(8n_s + i) \cdot 2^i \right) \bmod 30 \quad \text{[Equation 6]}$$

Herein, c(n) denotes a PN sequence. c(n) can be defined by a length-31 Gold sequence. Equation 7 below shows an example of the sequence c(n).

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_1(n+1)+x_1(n)) \bmod 2 \quad \text{[Equation 7]}$$

Herein, NC=1600. x1(i) denotes a 1st m-sequence. x2(i) denotes a 2nd m-sequence. For example, the 1st m-sequence can be initialized to x1(0)=1, x1(n)=0(n=1, 2, . . . , 30) in every radio frame. In addition, the 2nd m-sequence can be initialized in every radio frame according to a cell identity (ID). Equation 8 below shows an example the initialization of the 2nd m-sequence.

$$c_{init} = \sum_{i=0}^{30} x_2(i) \cdot 2^i = \lfloor N_{cell\_ID} / 30 \rfloor \quad \text{[Equation 8]}$$

Herein, $N_{cell\_ID}$ denotes a cell ID.

The sequence shift pattern fss can be expressed by Equation 9 below.

$$f_{ss} = ((N_{cell\_ID} \bmod 30) + d) \bmod 30 \quad \text{[Equation 9]}$$

Herein, d∈{0, 1, . . . , 29} is a group allocation parameter. The group allocation parameter d can be determined by a higher layer. The group allocation parameter may be a common parameter which is commonly used by all UEs in a cell.

Next, the base sequence number v in the group is described. When one resource block includes 12 subcarriers, if the length M of the base sequence is less than 72, each group includes only one base sequence (v=0). In this case, sequence hopping is not applied.

When one resource block includes 12 subcarriers, if the length M of the base sequence is greater than or equal to 72, each group includes 2 base sequences (v=0, 1). In this case, if the sequence hopping is set instead of the group hopping, the sequence hopping may be performed in such a manner that the base sequence number v in the group changes in every slot. If the sequence hopping is not performed, the base sequence number v in the group can be fixed to 0.

When the sequence hopping is performed, the base sequence number v in the group can be expressed by Equation 10 below.

$$v = c(n_s) \quad \text{[Equation 10]}$$

Herein, c(n) denotes a PN sequence and may be the same as that described in Equation 7 above. For example, the 1st m-sequence can be initialized to x1(0)=1, x1(n)=0(n=1, 2, . . . , 30) in every radio frame. In addition, the 2nd m-sequence can be initialized in every radio frame according to a cell ID and a sequence shift pattern fss. Equation 11 below shows an example the initialization of the 2nd m-sequence.

$$c_{init} = \sum_{i=0}^{30} x_2(i) \cdot 2^i = \lfloor N_{cell\_ID} / 30 \rfloor \cdot 2^5 + f_{ss} \quad \text{[Equation 11]}$$

The base sequence ru,v(n) can be cyclically shifted according to Equation 12 below to generate a cyclically shifted sequence ru,v(n, Ics).

$$r_{u,v}(n, I_{cs}) = r_{u,v}(n) \cdot \exp\left(\frac{j 2\pi I_{cs} n}{12}\right) \quad \text{[Equation 12]}$$

Herein, 2πIcs/12 denotes a cyclic shift (CS) amount, and Ics denotes a CS index indicating the CS amount (0≤Ics<12, where Ics is integer).

The CS index Ics can be determined according to a cell-specific CS parameter, a UE-specific CS parameter, and a hopping CS parameter. The cell-specific CS parameter has a different value for each cell, but is common to all UEs in a cell. The UE-specific CS parameter may have a different value for each UE in the cell. The hopping CS parameter may have a different value for each slot. Therefore, the CS index may vary for each slot. When the CS index varies for each slot and thus the CS amount varies, this is called slot-level hopping of the CS amount.

The CS index Ics can be expressed by Equation 13 below.

$$I_{cs} = (I_a + I_b + I(n_s)) \bmod 12 \quad \text{[Equation 13]}$$

Herein, Ia is determined by the cell-specific CS parameter, Ib denotes the UE-specific CS parameter, and I(ns) denotes the hopping CS parameter.

The cell-specific parameter can be determined by a higher layer such as RRC. Table 3 below shows an example of the parameter Ia determined by the cell-specific CS parameter.

TABLE 3

| Cell-specific CS parameter | Ia |
|---|---|
| 0 | 0 |
| 1 | 2 |
| 2 | 3 |
| 3 | 4 |
| 4 | 6 |
| 5 | 8 |
| 6 | 9 |
| 7 | 10 |

The UE-specific CS parameter Ib can be indicted by a CS field of a UL grant. In a case where radio resource scheduling for data transmission is persistent scheduling or semi-persistent scheduling, if there is no UL grant corresponding to data transmission, the UE-specific CS parameter Ib may be set to zero.

Table 4 below shows an example of the UE-specific CS parameter determined by the CS field.

TABLE 4

| UE-specific CS parameter | Ib |
|---|---|
| 000 | 0 |
| 001 | 6 |
| 010 | 3 |
| 011 | 4 |
| 100 | 2 |
| 101 | 8 |
| 110 | 10 |
| 111 | 9 |

The hopping CS parameter I(ns) can be expressed by Equation 14 below.

$$I(n_s) = \sum_{i=0}^{7} c(8 N_{symb} \cdot n_s + i) \cdot 2^i \quad \text{[Equation 14]}$$

Herein, c(n) denotes a PN sequence, and $N_{symb}$ denotes the number of OFDM symbols included in a slot. The PN sequence c(n) may be the same as that of Equation 7 above. For example, the $1^{st}$ m-sequence can be initialized to $x_1(0)=1$, $x_1(n)=0(n=1, 2, \ldots, 30)$ in every radio frame. In addition, the $2^{nd}$ m-sequence can be initialized in every radio frame according to a cell ID and a sequence shift pattern $f_{ss}$. The initialization of the $2^{nd}$ m-sequence may be the same as the described in Equation 11 above.

As such, the reference signal sequence consisting of the generated complex-valued elements are mapped to subcarriers of a DM RS symbol in a subframe.

The transmitter can transmit data through a plurality of Tx antennas. If the transmitter performs multi-antenna transmission that uses a plurality of Tx antennas, one resource grid (see FIG. 3) is defined for each Tx antenna. The transmitter can transmit data by using a transmit diversity scheme. In the transmit diversity scheme, the same data is transmitted through the plurality of Tx antennas. When using the transmit diversity scheme, a diversity gain can be attained, and data reliability can be increased.

Examples of the transmit diversity scheme include space-time block coding (STBC), cyclic delay diversity (CDD), etc.

Figure 16:
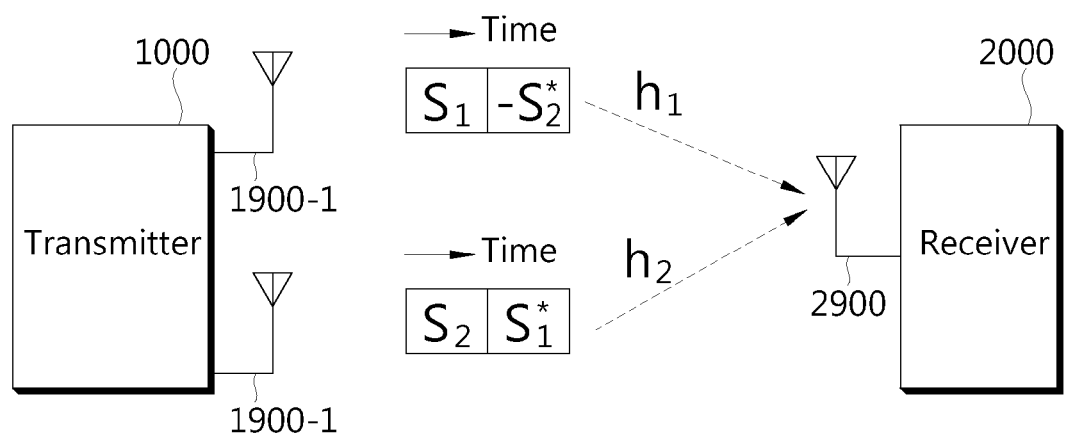
FIG. 16 shows an example of a data transmission method using STBC.

FIG. 16 shows an example of a data transmission method using STBC. A well-known Alamouti code is used in the data transmission method of FIG. 16.

Referring to FIG. 16, a transmitter 1000 transmits data through two Tx antennas 1900-1 and 1900-2. A receiver 2000 receives data through one Rx antenna 2900.

During a $1^{st}$ TTI, the transmitter 1000 transmits a $1^{st}$ symbol $s_1$ through the $1^{st}$ Tx antenna 1900-1, and transmits a $2^{nd}$ symbol $s_2$ through the $2^{nd}$ Tx antenna 1900-2. During a $2^{nd}$ TTI, the transmitter 1000 transmits a symbol $-s_2^*$ transformed from the $2^{nd}$ symbol through the $1^{st}$ Tx antenna 1900-1, and transmits a symbol $s_1^*$ transformed from the $1^{st}$ symbol through the $2^{nd}$ Tx antenna 1900-2. Herein, $(\bullet)^*$ denotes a complex conjugate of $(\bullet)$. The $2^{nd}$ TTI is a TTI subsequent to the $1^{st}$ TTI. The $2^{nd}$ TTI may be a TTI contiguous to the $1^{st}$ TTI or a TTI non-contiguous to the $1^{st}$ TTI.

The receiver 2000 receives a $1^{st}$ Rx signal $r_1$ during the $1^{st}$ TTI and receives a $2^{nd}$ Rx signal $r_2$ during the $2^{nd}$ TTI, each of which is expressed by Equation 15 below.

$$r_1 = h_1 s_1 + h_2 s_2 + n_1$$

$$r_2 = -h_1 s_2^* + h_2 s_1^* + n_2 \quad \text{[Equation 15]}$$

In Equation 15, $h_1$ denotes a $1^{st}$ channel response from the $1^{st}$ Tx antenna 1900-1 to the Rx antenna 2900, and $h_2$ denotes a $2^{nd}$ channel response from the $2^{nd}$ Tx antenna 1900-2 to the Rx antenna 2900. In this case, it is assumed that a channel property is almost not changed in the duration from the $1^{st}$ TTI to the $2^{nd}$ TTI. $n_1$ denotes noise of a $1^{st}$ channel, and $n_2$ denotes noise of a $2^{nd}$ channel. The noise may be additive white Gaussian noise (AWGN).

The $1^{st}$ symbol $s_1$ can be estimated by combining $r_1$ and $r_2$ according to Equation 16 below.

$$\begin{aligned}\tilde{s}_1 &= h_1^* r_1 + h_2 r_2^* \\ &= |h_1|^2 s_1 + h_1^* h_2 s_2 + h_1^* n_1 - h_1^* h_2 s_2 + |h_2|^2 s_1 + h_2 n_2^* \\ &= (|h_1|^2 + |h_2|^2) s_1 + \tilde{n}_1\end{aligned} \quad \text{[Equation 16]}$$

The $2^{nd}$ symbol $s_2$ can be estimated by combining $r_1$ and $r_2$ according to Equation 17 below.

$$\begin{aligned}\tilde{s}_2 &= h_2^* r_1 - h_1 r_2^* \\ &= h_1 h_2^* s_1 + |h_2|^2 s_2 + h_2^* n_1 - \\ &\quad (-|h_1|^2 s_2 + h_1 h_2^* s_1 + h_1 n_2^*) \\ &= (|h_1|^2 + |h_2|^2) s_2 + \tilde{n}_2\end{aligned} \quad \text{[Equation 17]}$$

Although it has been described that STBC is applied for two Tx antennas, it is also possible to apply STBC when using two or more Tx antennas.

Figure 17:
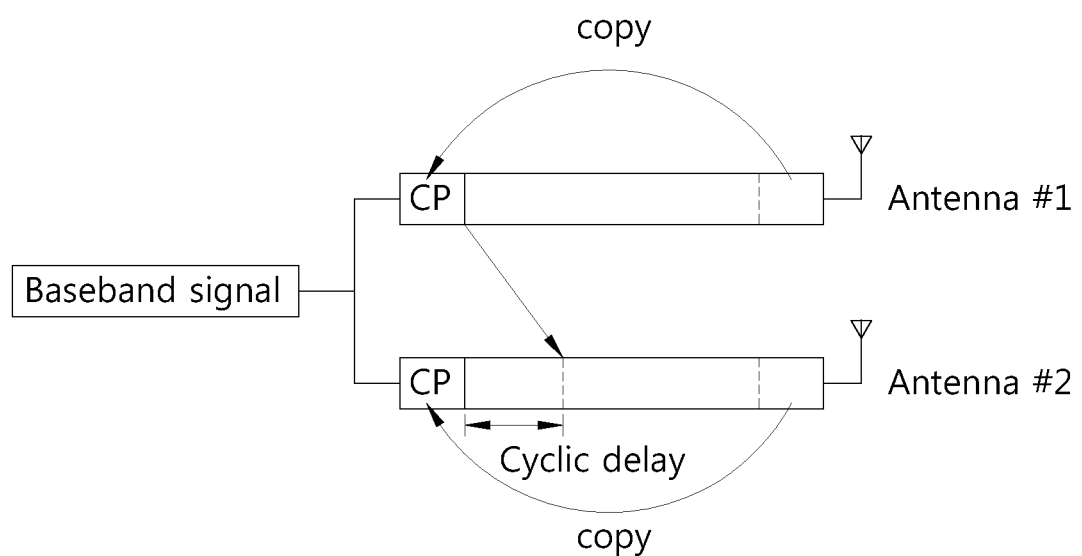
FIG. 17 shows an example of a data transmission method using CDD.

FIG. 17 shows an example of a data transmission method using CDD. A signal obtained by inserting a CP to a baseband signal is transmitted through an antenna #1. A signal obtained by cyclically delaying or linearly delaying the baseband signal by a cyclic delay value and by inserting a CP is transmitted through an antenna #2. Although CDD is applied for two Tx antennas herein for example, it is also possible to apply CDD when using two or more Tx antennas by using a different cyclic delay value for each Tx antenna.

To apply the CDD, a baseband signal which is a time-domain signal output from an IFFT unit may be cyclically delayed by a different cyclic delay value for each Tx antenna. However, a cyclic delay in the time domain is equivalent to multiplication of a phase sequence in a frequency domain. Therefore, to apply the CDD, complex-valued symbols output from a DFT unit may be implemented in such a manner that the symbols are multiplied by different phase sequences for respective Tx antennas and then are mapped to subcarriers.

The CDD artificially composites independent channels for the respective antennas to increase frequency selectivity. By increasing the frequency selectivity, a frequency diversity gain can be obtained. This is the same as applying beamforming in a physical or virtual subcarrier level.

Figure 18:
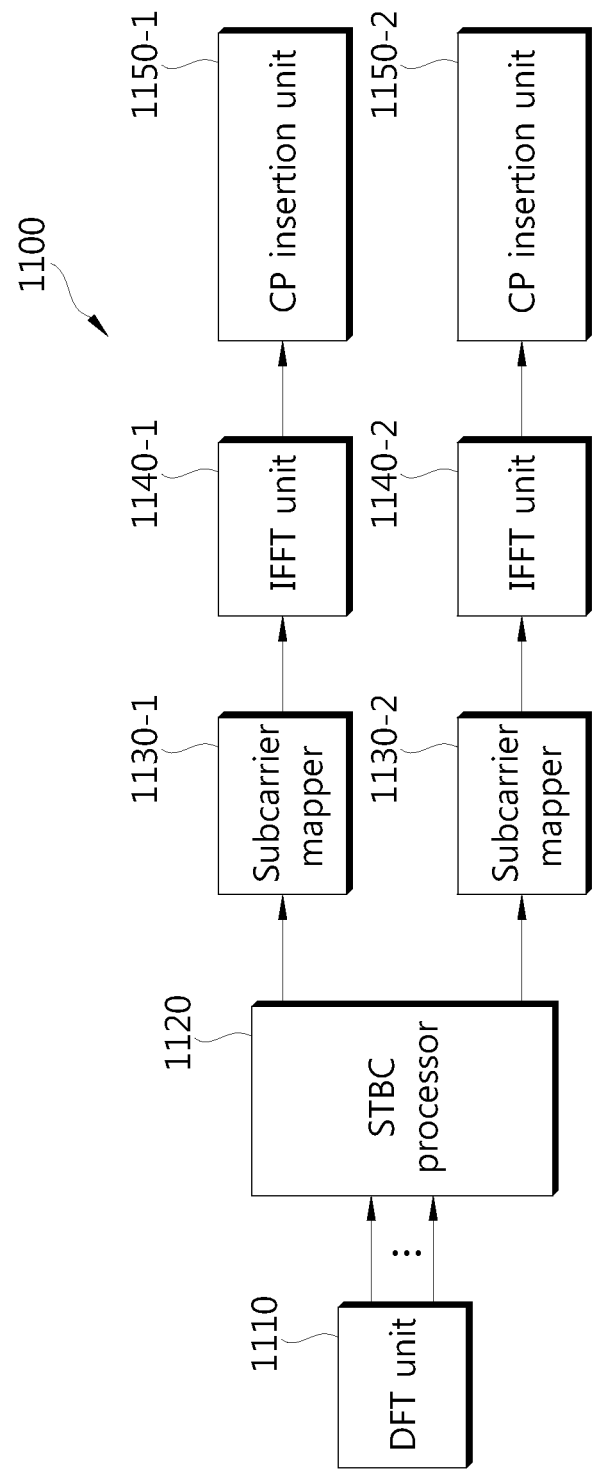
FIG. 18 is a block diagram showing an exemplary structure of an STBC data processor for two Tx antennas.

FIG. 18 is a block diagram showing an exemplary structure of an STBC data processor for two Tx antennas.

Referring to FIG. 18, an STBC data processor 1100 includes a DFT unit 1110, an STBC processor 1120, two subcarrier mappers 1130-1 and 1130-2, two IFFT units 1140-1 and 1140-2, and two CP insertion units 1150-1 and 1150-2. The data processor 1110 may further include a channel coding unit (not shown) and a modulator (not shown). The $1^{st}$ subcarrier mapper 1130-1, the $1^{st}$ IFFT unit 1140-1, and the $1^{st}$ CP insertion unit 1150-1 correspond to a $1^{st}$ Tx antenna. The $2^{nd}$ subcarrier mapper 1130-2, the $2^{nd}$ IFFT unit 1140-2, and the $2^{nd}$ CP insertion unit 1150-2 correspond to a $2^{nd}$ Tx antenna.

Modulated symbols are input to the DFT unit 1110. The DFT unit 1110 performs DFT on the input modulated symbols to output complex-valued symbols. The STBC processor 1120 processes the input complex-valued symbols by using an STBC scheme to generate an STBC code.

Table 5 shows an example of the STBC code generated by the STBC processor 1120.

TABLE 5

|  | 1st data symbol | 2nd data symbol |
| --- | --- | --- |
| 1st transmit antenna | $S_1, S_2, \ldots, S_M$ | $-S_{M+1}^*, -S_{M+2}^*, \ldots, -S_{2M}^*$ |
| 2nd transmit antenna | $S_{M+1}, S_{M+2}, \ldots, S_{2M}$ | $S_1^*, S_2^*, \ldots, S_M^*$ |

For a $1^{st}$ data symbol of the $1^{st}$ Tx antenna, modulated symbols $d_1, \ldots, d_M$ are input to the DFT unit 1110. The DFT unit 1110 performs DFT on the input modulated symbols to output complex-valued symbols $s_1, \ldots, s_M$. Herein, M may be equal to the number of subcarriers included in a radio resource allocated for data transmission in a frequency domain.

For a $1^{st}$ data symbol of the $2^{nd}$ Tx antenna, modulated symbols $d_{M+1}, \ldots, d_{2M}$ are input to the DFT unit 1110. The DFT unit 1110 performs DFT on the input modulated symbols to output complex-valued symbols $s_{M+1}, \ldots, s_{2M}$.

For a $2^{nd}$ data symbol of the $1^{st}$ Tx antenna, modulated symbols $d_{M+1}, \ldots, d_{2M}$ are input to the DFT unit 1110. The DFT unit 1110 performs DFT on the input modulated symbols to generate complex-valued symbols $s_{M+1}, \ldots, s_{2M}$. Each of the symbols $s_{M+1}, \ldots, s_{2M}$ is multiplied by a minus sign '−', and symbols $-s_{M+1}^*, \ldots, -s_{2M}^*$ are generated by obtaining a complex conjugate. Alternatively, the symbols $-s_{M+1}^*, \ldots, -s_{2M}^*$ may be generated by using complex-valued symbols output for the $1^{st}$ data symbol of the $2^{nd}$ Tx antenna.

For a $2^{nd}$ data symbol of the $2^{nd}$ Tx symbol, modulated symbols $d_1, \ldots, d_M$ are input to the DFT unit 1110. The DFT unit 1110 performs DFT on the input modulated symbols to output complex-valued symbols $s_1, \ldots, s_M$. Symbols $s_1^*, \ldots, s_M^*$ are generated by obtaining a complex conjugate for each of the symbols $s_1, \ldots, s_M$. Alternatively, the symbols $s_1^*, \ldots, s_M^*$ may be generated by using the complex-valued symbols $s_1, \ldots, s_M$ output for the $1^{st}$ data symbol of the $1^{st}$ Tx antenna.

Each of the $1^{st}$ data symbol and the $2^{nd}$ data symbol is included in a radio resource allocated for data transmission. The $1^{st}$ data symbol and the $2^{nd}$ data symbol are referred to as a symbol pair. For one example, if the radio resource shown in FIG. 6 is allocated for data transmission, 12 OFDM symbols out of 14 OFDM symbols in a subframe are data symbols. The 12 data symbols may form 6 symbol pairs. Hereinafter, a symbol pair can be expressed in a format of (a symbol index of the $1^{st}$ data symbol, a symbol index of the $2^{nd}$ data symbol). In this case, the 6 symbol pairs may be (0, 1), (2, 4), (5, 6), (7, 8), (9, 11), and (12, 13). For another example, if the radio resource shown in FIG. 7 is allocated for data transmission, 10 OFDM symbols out of 12 OFDM symbols in the subframe are data symbols. If the radio resource allocated for data transmission occupies the same frequency domain in a $1^{st}$ slot and a $2^{nd}$ slot, the 10 data symbols may form 5 symbol pairs. The 5 symbol pairs may be (0, 1), (3, 4), (5, 6), (7, 9), and (10, 11).

The $1^{st}$ subcarrier mapper 1130-1 maps the symbols $s_1, \ldots, s_M$ to subcarriers of the $1^{st}$ data symbol. The $2^{nd}$ subcarrier mapper 1130-2 maps the symbols $s_{M+1}, \ldots, s_{2M}$ to subcarriers of the $1^{st}$ data symbol. The $1^{st}$ subcarrier mapper 1130-1 maps the symbols $-s_{M+1}^*, \ldots, -s_{2M}^*$ to subcarriers of the $2^{nd}$ data symbol. The $2^{nd}$ subcarrier mapper 1130-2 maps the symbols $s_1^*, \ldots, s_M^*$ to subcarriers of the $2^{nd}$ data symbol.

Figure 19:
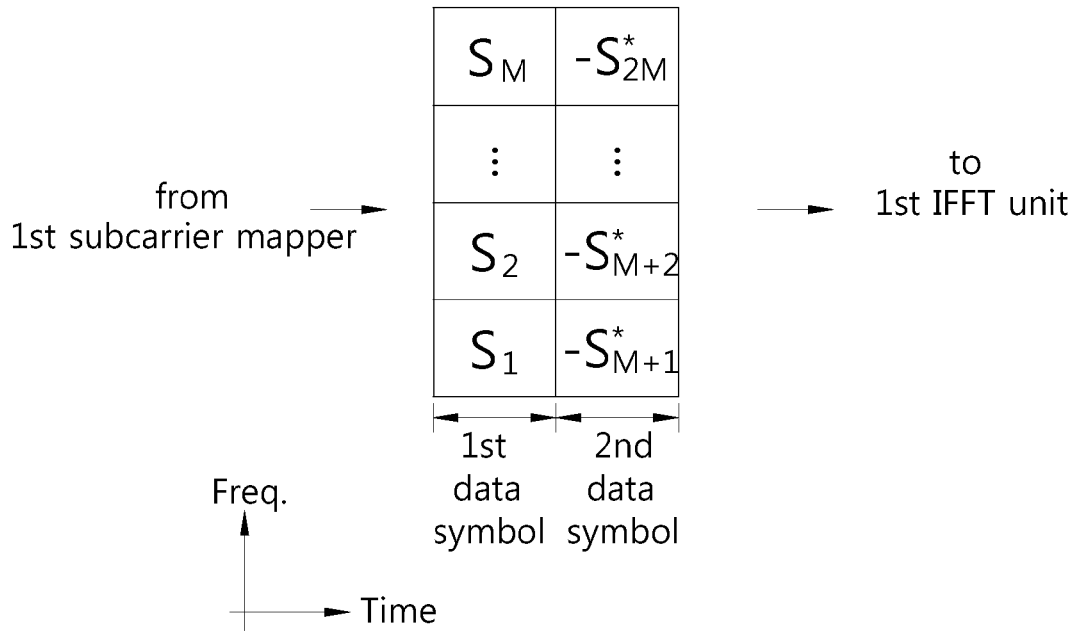
FIG. 19 shows an example of a method for mapping an STBC code to subcarriers by a 1st subcarrier mapper and a 2nd subcarrier mapper.
Figure 19:
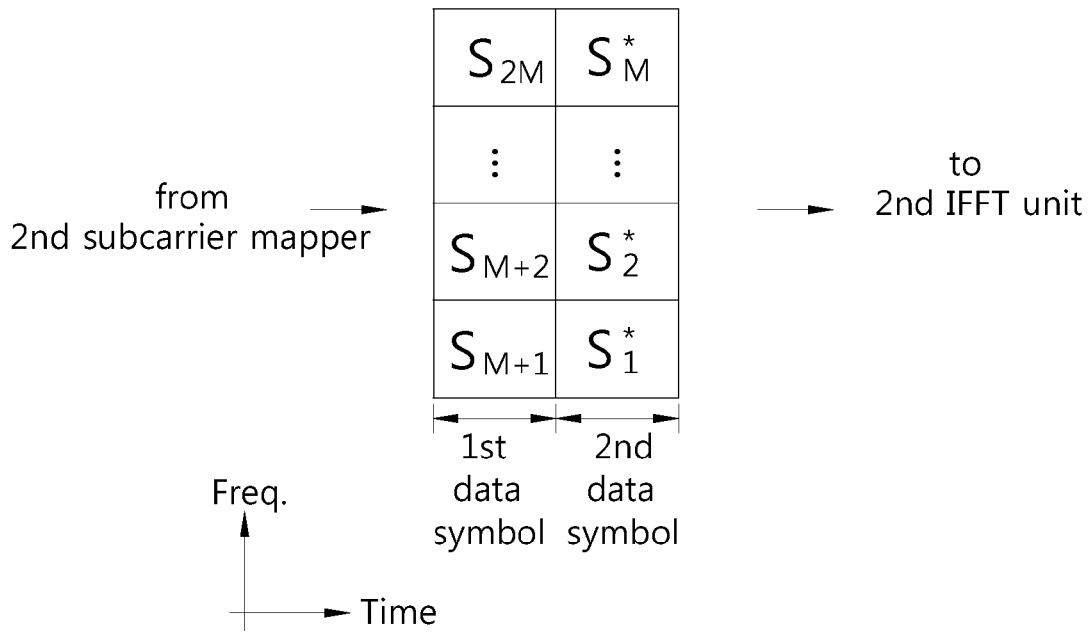

FIG. 19 shows an example of a method for mapping an STBC code to subcarriers by a $1^{st}$ subcarrier mapper and a $2^{nd}$ subcarrier mapper. The $1^{st}$ subcarrier mapper and the $2^{nd}$ subcarrier mapper may be included in the STBC data processor (see FIG. 18) for two Tx antennas.

The STBC data processor described in FIG. 18 and FIG. 19 is also applicable to three or more Tx antennas. For example, when using 4 Tx antennas, STBC is applicable to a symbol pair consisting of 2 data symbols. The STBC is applicable to a $1^{st}$ TX antenna and a $2^{nd}$ Tx antenna. The STBC is applicable to a $3^{rd}$ Tx antenna and a $4^{th}$ Tx antenna. In addition, a transparent transmission method can be used between two groups. The transparent transmission method is a transmission method in which single antenna transmission can be assumed in a receiver regardless of which transmission method is used in a transmitter. Examples of the transparent transmission method include small CDD, precoding vector switching (PVS), etc.

In order for the receiver to be able to restore data transmitted using the STBC scheme, the receiver has to be capable of perform channel estimation for each Tx antenna. For this, it is necessary to transmit a DM RS for each Tx antenna. The DM RS for each Tx antenna is transmitted through a DM RS symbol (see FIG. 6 and FIG. 7) in a subframe. In this case, to distinguish the DM RS for each Tx antenna, a reference signal sequence of the DM RS for each Tx antenna may use a different sequence. A method of distinguishing the DM RS for each Tx antenna by using the different sequence uses code division multiplexing (CDM). The reference signal sequences for the respective Tx antennas may be orthogonal to each other. Alternatively, the reference signal sequences for the respective Tx antennas may have a lower correlation. For example, the reference signal sequence for each Tx antenna may use a cyclically shifted sequence which is cyclically shifted from the same base sequence by a CS amount for each Tx antenna. In this case, the CS amount for each Tx antenna shall have a sufficient interval to distinguish a channel for each Tx antenna. It is assumed that a wireless communication system operates in a typical urban (TU) channel environment in which an effective OFDM symbol length is 66.7 μs and a maximum delay spread is 5 μs. In this case, the CS amount shall be a unit of at least 5 μs. Therefore, 13 (=66.7/5) CS amounts are possible. In 3GPP LTE, 12 available CS amounts are assumed by giving a margin.

Hereinafter, a CS amount applied to a DM RS for each Tx antenna will be described. In this case, the number of Tx antennas is 2, and a radio resource for data transmission is the same as that shown in FIG. 6 or FIG. 7. The CS amount is hereinafter denoted by 'a'.

In a $1^{st}$ slot in a subframe, a CS amount for a DM RS for a $1^{st}$ antenna is denoted by a(0), and a CS amount for a DM RS for a $2^{nd}$ antenna is denoted by a(2). In a $2^{nd}$ slot in the subframe, a CS amount for a DM RS for the $1^{st}$ antenna is denoted by a(1), and a CS amount for a DM RS for the $2^{nd}$ antenna is denoted by a(3). a(0) and (1) may be determined according to the aforementioned descriptions on the reference signal sequence. a(2) and a(3) may be determined in various manners.

For one example, a specific offset is used. a(2) may be a value obtained from a(0) by applying a specific offset. a(3) may be a value obtained from a(1) by applying a specific offset.

For another example, CS amounts for the $1^{st}$ antenna are applied on a subframe basis to CS amounts for the $2^{nd}$ antenna. The $1^{st}$ antenna determines the CS amount of the $1^{st}$ slot and the $2^{nd}$ slot according to the aforementioned description. The $2^{nd}$ antenna uses the CS amounts used in the $1^{st}$ antenna by changing the CS amounts. That is, a(0) is identical to a(3), and a(1) is identical to a(2). In this case, a slot level hopping pattern for a predetermined CS amount may be reused.

For another example, the CS amounts for the $1^{st}$ antenna are applied reversely on a radio frame basis to the CS amounts for the $2^{nd}$ antenna. In 20 slots in the radio frame, CS amounts for a DM RS for the $1^{st}$ antenna are sequentially denoted by a(0), a(1), . . . , a(19). CS amounts for a DM RS for the $2^{nd}$ antenna may be sequentially denoted by a(19), a(18), . . . , a(0).

In another example, if the CS amount is a=2πIcs/12, and Ics denotes a CS index indicating the CS amount, then Equation 13 for calculating the CS index Ics can be changed to Equation 18 below.

$$Ics = (Ia + Ib + I(n_s')) \bmod 12 \qquad \text{[Equation 18]}$$

That is, $n_s'$ is used instead of a slot number $n_s$. Equation 19 below shows an example of $n_s'$.

$$n_s' = 20(n_a - 1) + n_s \qquad \text{[Equation 19]}$$

In Equation 19, $n_a$ denotes an antenna index. It is assumed that $n_a$ of the $1^{st}$ antenna is 1, and $n_a$ of the $2^{nd}$ antenna is 2.

Equation 20 below shows another example of $n_s'$.

$$n_s' = N_{ant} n_s + n_a - 1 \qquad \text{[Equation 20]}$$

In Equation 20, Nant denotes the number of Tx antennas, and na denotes an antenna index.

In order to perform data transmission based on STBC in case of using two Tx antennas, the number of data symbols included in a radio resource allocated for data transmission in a time domain shall be an even number. This is because the STBC can be applied when two data symbols have to form a symbol pair. However, there may be a case where the number of data symbols included in the radio resource in the time domain is an odd number. For example, if an SRS is transmitted or if a radio resource allocated to a 1st slot in a subframe is frequency hopped in a $2^{nd}$ slot, the number of data symbols may be an odd number. If the number of data symbols is the odd number, there is a remaining symbol that cannot form a symbol pair. Hereinafter, the remaining data symbol that cannot form the symbol pair is called a residue symbol. Data can be transmitted through the symbol pair by using the STBC scheme, and can be transmitted through the residue symbol by using the CDD scheme.

Now, a case where a residue symbol is generated in FIG. 20 to FIG. 23 will be described. The number of reference signal symbols in a subframe and the location of reference signal symbols shown in FIG. 20 to FIG. 23 are for exemplary purposes only. In addition, data symbols forming a symbol pair in the subframe are also for exemplary purposes only.

Figure 20:
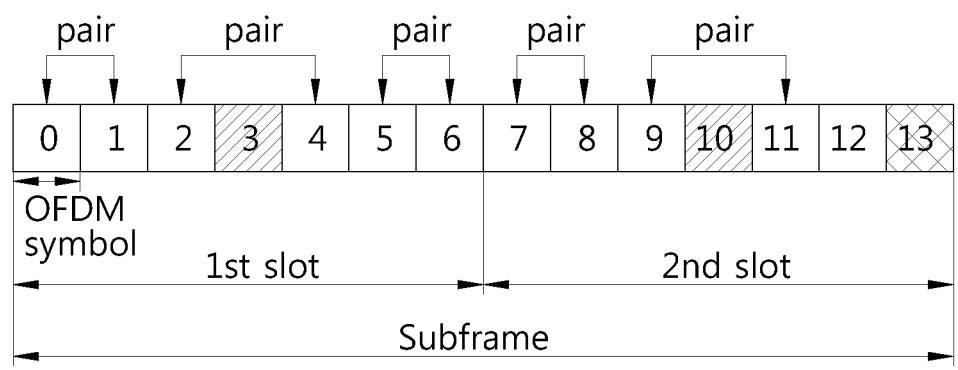
FIG. 20 shows an example of a radio resource for SRS transmission in case of using a normal CP.

FIG. 20 shows an example of a radio resource for SRS transmission in case of using a normal CP.

Referring to FIG. 20, a subframe includes a 1st slot and a 2nd slot. Each of the 1st slot and the 2nd slot includes 7 OFDM symbols. 14 OFDM symbols in the subframe are numbered with symbol indices 0 to 13. A DM RS is transmitted by using OFDM symbols having symbol indices 3 and 10. An SRS is transmitted by using an OFDM symbol with a symbol index 13. 3 OFDM symbols out of the 14 OFDM symbols in the subframe are reference signal symbols, and the remaining 11 OFDM symbols are data symbols. Since the number of data symbols is an odd number, 10 data symbols out of 11 data symbols form 5 symbol pairs, and one data symbol cannot form a symbol pair and thus becomes a residue symbol. The 5 symbol pairs are (0, 1), (2, 4), (5, 6), (7, 8), and (9, 11). A data symbol with a symbol index 12 is a residue symbol.

Figure 21:
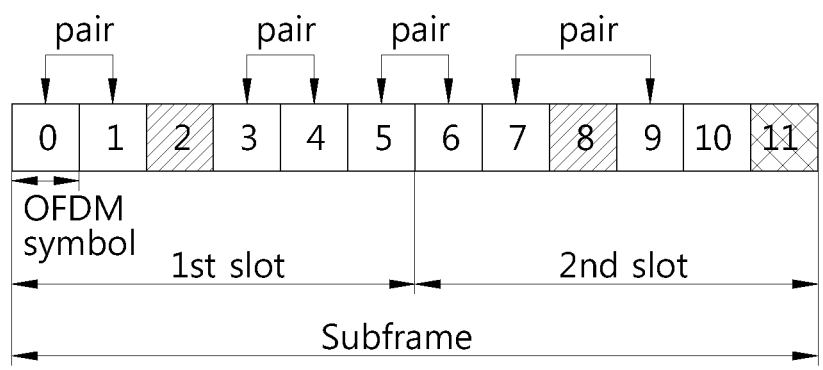
FIG. 21 shows an example of a radio resource for SRS transmission in case of an extended CP.

FIG. 21 shows an example of a radio resource for SRS transmission in case of an extended CP.

Referring to FIG. 21, a subframe includes a 1st slot and a 2nd slot. Each of the 1st slot and the 2nd slot includes 6 OFDM symbols. 12 OFDM symbols in the subframe are numbered with symbol indices 0 to 11. A DM RS is transmitted by using OFDM symbols having symbol indices 2 and 8. An SRS is transmitted by using an OFDM symbol with a symbol index 11. 3 OFDM symbols out of the 12 OFDM symbols in the subframe are reference signal symbols, and the remaining 9 OFDM symbols are data symbols. Since the number of data symbols is an odd number, 8 data symbols out of 9 data symbols form 4 symbol pairs, and one data symbol cannot become a residue symbol. The 4 symbol pairs are (0, 1), (3, 4), (5, 6), and (7, 9). A data symbol with a symbol index 10 is a residue symbol. In this case, in order for the symbol indices 5 and 6 to form a symbol pair, subcarriers allocated in each of the 1st slot and the 2nd slot in the subframe have to be identical in a frequency domain. That is, frequency hopping must not be performed within the subframe.

Figure 22:
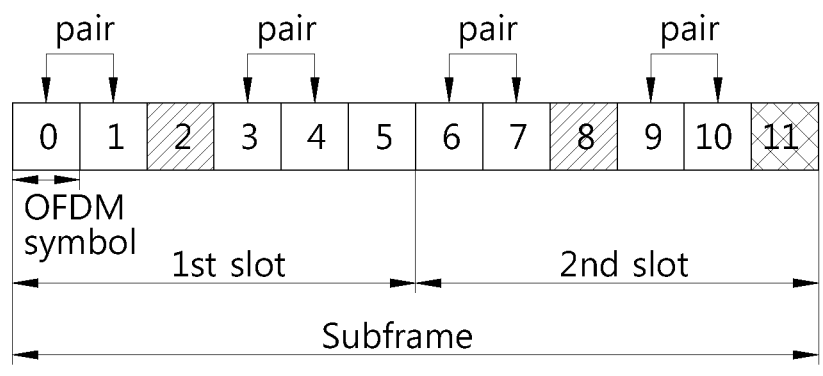
FIG. 22 shows another example of a radio resource for SRS transmission in case of using an extended CP.

FIG. 22 shows another example of a radio resource for SRS transmission in case of using an extended CP.

Referring to FIG. 22, four symbol pairs are (0, 1), (3, 4), (6, 7), and (9, 10). A data symbol with a symbol index 5 is a residue symbol. Unlike FIG. 22, the example of FIG. 21 can also be applied in a case where subcarriers allocated in each of a $1^{st}$ slot and a $2^{nd}$ slot in a subframe occupy different frequency regions. That is, it can be applied irrespective of frequency hopping within the subframe.

Figure 23:
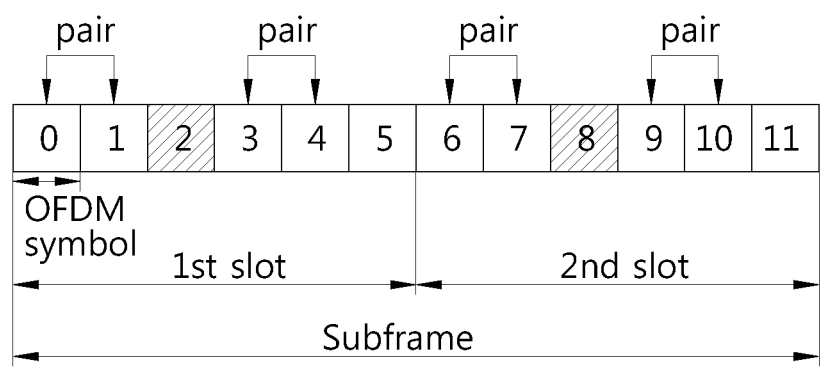
FIG. 23 shows an example of a radio resource in case of using an extended CP.

FIG. 23 shows an example of a radio resource in case of using an extended CP.

Referring to FIG. 23, each slot in a subframe includes two symbol pairs and one residue symbol. In a 1st slot, symbol pairs are (0, 1) and (3, 4), and a residue symbol is a data symbol with a symbol index 5. In a 2nd slot, symbol pairs are (6, 7) and (9, 10), and a residue symbol is a data symbol with a symbol index 11. The example of FIG. 23 is also applicable to a case where subcarriers allocated in each of the 1st slot and the 2nd slot in the subframe occupy different frequency regions. That is, it can be applied irrespective of frequency hopping within the subframe.

As described with reference to FIG. 20 to FIG. 23, data can be transmitted through a symbol pair by using the STBC scheme, and can be transmitted through a residue symbol by using the CDD scheme.

A DM RS transmitted through a DM RS symbol in the subframe is used for channel estimation for each antenna in case of the STBC. In addition, for the CDD, the DM RS is used as a dedicated RS for CDD demodulation.

Hereinafter, a cyclic delay value applied to a residue symbol for each Tx antenna will be described. In the following descriptions, the number of Tx antennas is 2, and a radio resource for data transmission is the same as shown in FIG. 6 or FIG. 7. A 1st cyclic delay value for a 1st Tx antenna is denoted by a(4), and a 2nd cyclic delay value for a 2nd Tx antenna is denoted by a(5).

A cyclic delay value to be applied to a residue symbol may be a value predetermined between a BS and a UE. Alternatively, the cyclic delay value can be indicated by the BS to the UE. In this case, the cyclic delay value for each antenna can be indicated. Alternatively, if the BS indicates the 1st cyclic delay value to the UE, the UE may attain the 2nd cyclic delay value from the 1st cyclic delay value.

In another method, the cyclic delay value may be associated with a CS amount used in a DM RS.

For one example, the cyclic shift value and the CS amount can be related as expressed by Equation 21 below.

$$a(4)=a(1), a(5)=a(3) \qquad \text{[Equation 21]}$$

In Equation 21, a(1) denotes a CS amount for a DM RS for the 1st antenna in a 2nd slot, and a(3) denotes a CS amount for a DM RS for the 2nd antenna. That is, the cyclic delay value is equal to the CS amount used for the DM RS of the 2nd slot.

For another example, the cyclic delay value and the CS amount may be related as expressed by Equation 22 below.

$$a(4)=a(0), a(5)=a(2) \qquad \text{[Equation 22]}$$

In Equation 22, a(0) denotes a CS amount for a DM RS for the 1st antenna in the 1st slot in the subframe, and a(2) denotes a CS amount for a DM RS for the 2nd antenna. That is, the cyclic delay value is equal to the CS amount used in the DM RS of the 1st slot.

As such, if the cyclic delay value is in association with the CS amount used in the DM RS, effective data transmission is possible in a situation where different Tx diversity schemes coexist. In addition, if the cyclic delay value is aligned to the CS amount, decoding performance can be improved. CDD is the same as applying beamforming with a subcarrier level. Therefore, a part to be constructed with the subcarrier level and a part to be destructed can be expressed by a function of a cyclic delay value and a direction of arrival (DoA) of a transmitter/receiver. If the cyclic delay value used in data transmission and the CS amount used in the DM RS are aligned, a part to be constructed/destructed in the DM RS becomes coincide with a part to be constructed/destructed in the data. In this case, channel estimation performance of the part to be constructed increases. Since the part to be destructed is a part in which even the data cannot be received, energy to be used in the part to be destructed can be used for channel estimation of the part to be constructed.

For another example, the cyclic delay value is also $a=2\pi Ics/12$ which is the same as the CS amount, and Ics may be an index indicating a cyclic delay value. Not only the CS amount but also the cyclic delay value can be obtained by changing Equation 13 to Equation 23 below.

$$Ics=(Ia+Ib+I(n_s'))\bmod 12 \qquad \text{[Equation 23]}$$

That is, $n_s'$ is used instead of a slot number $n_s$. $n_s'$ denotes an index number by which a slot included in a radio frame and a residue symbol are indexed. For example, it is assumed that an SRS is transmitted only in a last OFDM symbol of a $1^{st}$ subframe among 10 subframes in the radio frame (see FIG. 20 or FIG. 21). In this case, the residue symbol of the $1^{st}$ subframe in the radio frame has an index number $n_s'=2$, and the index number $n_s'$ in the radio frame is numbered from 0 to 20.

Figure 24:
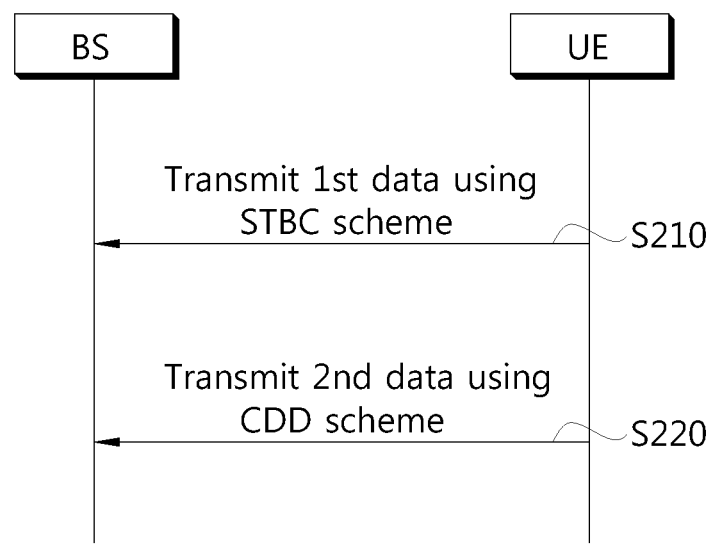
FIG. 24 is a flowchart showing a data transmission method according to an embodiment of the present invention.

FIG. 24 is a flowchart showing a data transmission method according to an embodiment of the present invention.

Referring to FIG. 24, a UE transmits $1^{st}$ data to a BS by using STBC through N data symbols (N<M, where N is a natural number) among M data symbols (M≥3, where M is a natural number) (step S210). In this case, a radio resource for data transmission includes M data symbols in a time domain, and the UE transmits $2^{nd}$ data to the BS by using a CDD scheme through M−N data symbols other than the N data symbol (step S220). The UE can receive from the BS a UL grant including a resource allocation field indicating a radio resource for data transmission. In this case, M may be an odd number, and N may be an even number.

The radio resource for data transmission may further include a DM RS symbol in the time domain. A cyclically shifted sequence in which a base sequence is cyclically shifted by a CS amount may be used in the DM RS. In addition, the radio resource may further include an SRS symbol in the time domain. A cyclic delay value used in transmission of the $2^{nd}$ data may be determined according to the CS amount.

Although the aforementioned description is based on UL data transmission, the same is also applicable to DL data transmission without alteration.

As such, an effective data transmission method can be provided by using the STBC scheme and the CDD scheme in a multiple antenna system. In particular, if data cannot be transmitted when using only the STBC scheme, the CDD scheme can be provided together so as to provide a data transmission method using the STBC scheme. Therefore, reliability of wireless communication can be improved, and overall system performance can be improved.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for data transmission performed by a user equipment in a wireless communication system,
    wherein a radio resource for data transmission includes M data symbols (M≥3, where M is a natural number) in a time domain, and the radio resource for data transmission further includes a demodulation reference signal (DMRS) symbol for a demodulation reference signal in the time domain, and the method comprising:
    transmitting first data by using a space-time block coding (STBC) scheme through N data symbols out of the M data symbols (N<M, where N is a natural number) using two transmission antennas, the N data symbols forming at least one symbol pair; and
    transmitting second data by using a cyclic delay diversity (CDD) scheme through M−N data symbols excluding the N data symbols using the two transmission antennas, the M−N data symbol being residue data symbols that cannot form the at least one symbol pair,
    wherein the CDD scheme is a transmit scheme that a signal obtained by inserting a cyclic prefix (CP) in a baseband signal is transmitted through a first antenna among the two transmission antennas, and a signal obtained by cyclically delaying or linearly delaying the baseband signal by a cyclic delay value and by inserting the CP in the baseband signal is transmitted through a second antenna among the two transmission antennas,
    wherein the demodulation reference signal uses a cyclically shifted sequence obtained by cyclically shifting a base sequence by a cyclic shift amount, and
    wherein the cyclic delay value used for the CDD scheme is associated with the cyclic shift amount used for the demodulation reference signal.

2. The method of claim 1, wherein M is an odd number and N is an even number.

3. The method of claim 1, wherein the radio resource further includes a sounding reference signal symbol for sounding reference signal transmission in the time domain.

4. The method of claim 1, further comprising receiving an uplink grant including a radio allocation field indicating the radio resource from a base station.

5. A transmitter in a wireless communication system,
    wherein a radio resource for data transmission includes M data symbols (M≥3, where M is a natural number) in a time domain, and the radio resource for data transmission further includes a demodulation reference signal (DMRS) symbol for a demodulation reference signal in the time domain, and the transmitter comprising:
    a radio frequency (RF) unit generating and transmitting a radio signal; and
    a data processor coupled to the RF unit and configured for:
    transmitting first data by using a space-time block coding (STBC) scheme through N data symbols (N<M, where N is a natural number) out of the M data symbols using two transmission antennas, the N data symbols forming at least one symbol pair; and
    transmitting second data by using a cyclic delay diversity (CDD) scheme through M−N data symbols excluding the N data symbols using the two transmission antennas, the M−N data symbols being residue data symbols that cannot form the at least one symbol pair, wherein the CDD scheme is a transmit scheme that a signal obtained by inserting a cyclic prefix (CP) in a baseband signal is transmitted through a first antenna among the two transmission antennas, and a signal obtained by cyclically delaying or linearly delaying the baseband signal by a cyclic delay value and by inserting the CP in the baseband signal is transmitted through a second antenna among the two transmission antennas, wherein the demodulation reference signal uses a cyclically shifted sequence obtained by cyclically shifting a base sequence by a cyclic shift amount, and wherein the cyclic delay value used for the CDD scheme is associated with the cyclic shift amount used for the demodulation reference signal.

6. The method of claim 1, wherein the number of residue data symbols is at least one.

\* \* \* \* \*